United States Patent
Yazaki et al.

(10) Patent No.: US 12,483,083 B2
(45) Date of Patent: Nov. 25, 2025

(54) ROTATING ELECTRIC MACHINE SYSTEM AND COMBINED POWER SYSTEM EQUIPPED THEREWITH

(71) Applicant: HONDA MOTOR CO., LTD., Tokyo (JP)

(72) Inventors: Manabu Yazaki, Wako (JP); Tatsuya Choji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 477 days.

(21) Appl. No.: 18/175,666

(22) Filed: Feb. 28, 2023

(65) Prior Publication Data

US 2023/0283139 A1    Sep. 7, 2023

(30) Foreign Application Priority Data

Mar. 1, 2022 (JP) .................................. 2022-030970
Mar. 1, 2022 (JP) .................................. 2022-030977

(51) Int. Cl.
*H02K 5/08* (2006.01)
*H02K 5/16* (2006.01)
*H02K 7/14* (2006.01)
*H02K 11/20* (2016.01)

(52) U.S. Cl.
CPC .............. *H02K 5/08* (2013.01); *H02K 5/161* (2013.01); *H02K 7/14* (2013.01); *H02K 11/20* (2016.01)

(58) Field of Classification Search
CPC .......... H02K 11/20; H02K 7/14; H02K 5/161; H02K 5/08
See application file for complete search history.

(56) References Cited

U.S. PATENT DOCUMENTS

| 5,664,810 | A | 9/1997 | Zielinski | |
|---|---|---|---|---|
| 8,736,122 | B2* | 5/2014 | Kamp | H02K 9/14 |
| | | | | 310/90 |
| 2022/0255411 | A1* | 8/2022 | Yazaki | H02K 11/21 |

FOREIGN PATENT DOCUMENTS

| DE | 19744422 A1 * | 4/1998 | ............. H02K 11/33 |
|---|---|---|---|
| JP | 9-112753 A | 5/1997 | |
| JP | 2000217309 * | 8/2000 | ............. H02K 11/00 |
| JP | 2006-194226 A | 7/2006 | |

* cited by examiner

Primary Examiner — Terrance L Kenerly
(74) Attorney, Agent, or Firm — Rankin, Hill & Clark LLP

(57) ABSTRACT

A rotating electric machine system is equipped with a fire prevention member that covers at least one end part of a rotating electric machine housing. By the fire prevention member, a fire prevention region is formed in which the rotating electric machine housing is not positioned. A first insertion hole is formed in the fire prevention member. The first insertion hole is closed by a terminal casing in which electric terminal portions are accommodated.

18 Claims, 15 Drawing Sheets

ROTATING ELECTRIC MACHINE SYSTEM AND COMBINED POWER SYSTEM EQUIPPED THEREWITH

CROSS-REFERENCE TO RELATED APPLICATIONS

This application is based upon and claims the benefit of priority from Japanese Patent Applications No. 2022-030970 filed on Mar. 1, 2022 and No. 2022-030977 filed on Mar. 1, 2022, the contents all of which are incorporated herein by reference.

BACKGROUND OF THE INVENTION

Field of the Invention

The present invention relates to a rotating electric machine system. Further, the present invention relates to a combined power system in which a rotating electric machine and an internal combustion engine are integrally constructed.

Description of the Related Art

A combined power system is equipped with a rotating electric machine system and an internal combustion engine. As disclosed in JP 2006-194226 A, in such a combined power system, a rotating shaft of the rotating electric machine system and an output shaft of the internal combustion engine are connected on the same axis. Accordingly, the rotating shaft and the output shaft rotate together integrally. The rotating electric machine system functions, for example, as a generator accompanying the rotating shaft rotating integrally together with the output shaft.

The combined power system, for example, is used as a power engine for providing propulsion in a flying object. In this instance, in the flying object, irrespective of whether the power engine is a gas engine or a combined power system, it is necessary to provide a fire preventative structure surrounding the power engine. Such a structure, as described in JP 2006-194226 A, is known as a fire preventative structure that is provided in the combined power system. In this case, the combined power system is surrounded by an enclosure in which carbon dioxide supplying equipment is included. At a time when a fire alarm device is activated, the carbon dioxide is supplied into the interior of the enclosure. Due to the carbon dioxide, extinguishing of the fire is carried out.

The rotating electric machine system is equipped with electric terminal portions. The electric terminal portions are terminal portions in order to electrically connect an external device (an external resistor or an external power source) to the rotating electric machine. In the case that the combined power system is surrounded by an enclosure, as described in JP H09-112753 A, it is necessary to provide a relay connector in the enclosure. More specifically, the electric terminal portions and the relay connector are electrically connected in advance. At a time when the combined power system is actually used, the external device is electrically connected to the relay connector.

SUMMARY OF THE INVENTION

In the case that a relay connector is provided as described in JP H09-112753 A, the number of the component parts increases. Thus, it may be considered to form a through hole in the enclosure, and to pass the electric terminal portions or electric wiring through such a through hole. However, in this case, a concern arises in that a flame shielding ability or a heat shielding ability decreases due to the through hole.

The present invention has the object of solving the aforementioned problem.

According to one embodiment of the present invention, a rotating electric machine system is provided including a rotating electric machine and a rotating electric machine housing in which a first end part and a second end part of a rotating shaft of the rotating electric machine are supported, the rotating electric machine system further including electric terminal portions electrically connected to the rotating electric machine, a terminal casing disposed at one end part of the rotating electric machine housing and in which the electric terminal portions are accommodated, and a fire prevention member configured to cover at least the one end part of the rotating electric machine housing, and to partition the rotating electric machine system into a first region in which the rotating electric machine housing is positioned, and a second region in which the rotating electric machine housing is not positioned and which serves as a fire prevention region, wherein a first insertion hole is formed in the fire prevention member, and the first insertion hole is closed by the terminal casing.

According to another embodiment of the present invention, a combined power system is provided which is constituted to include the rotating electric machine system described above, and an internal combustion engine. In this instance, the internal combustion engine includes an output shaft that rotates integrally with the rotating shaft of the rotating electric machine. The output shaft is connected to the second end part of the rotating shaft. The internal combustion engine is positioned in the first region.

In the present invention, by providing the fire prevention member in the rotating electric machine housing, at a boundary with the fire prevention member, the rotating electric machine system is partitioned into the first region in which the rotating electric machine housing is positioned, and the second region in which the rotating electric machine housing is not positioned. Even if sparking or excessive heat occurs in the first region, because the fire prevention member intercepts and holds back the sparking or the heat, the second region is protected from such sparking or heat and the like.

The first insertion hole is formed in the fire prevention member. The terminal casing in which the electric terminal portions are provided is engaged with the first insertion hole. Accordingly, it is not necessary to provide a relay connector in the fire prevention member. Therefore, an increase in the number of component parts is avoided.

The terminal casing is engaged with the first insertion hole. Stated otherwise, the first insertion hole is closed by the terminal casing. Consequently, a decrease in the flame shielding ability and the heat shielding ability of the fire prevention member due to the first insertion hole being formed in the fire prevention member is avoided.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Hereinafter, the respective terms "left", "right", "lower", and "upper" refer specifically to the left, right, lower and upper directions shown in FIGS. 3 to 5, FIG. 8, and FIG. 13. However, these directions are provided for the sake of convenience in order to simplify the description and facilitate understanding. In particular, the directions described in the specification are not limited to the directions when the combined power system is actually used.

Figure 1:
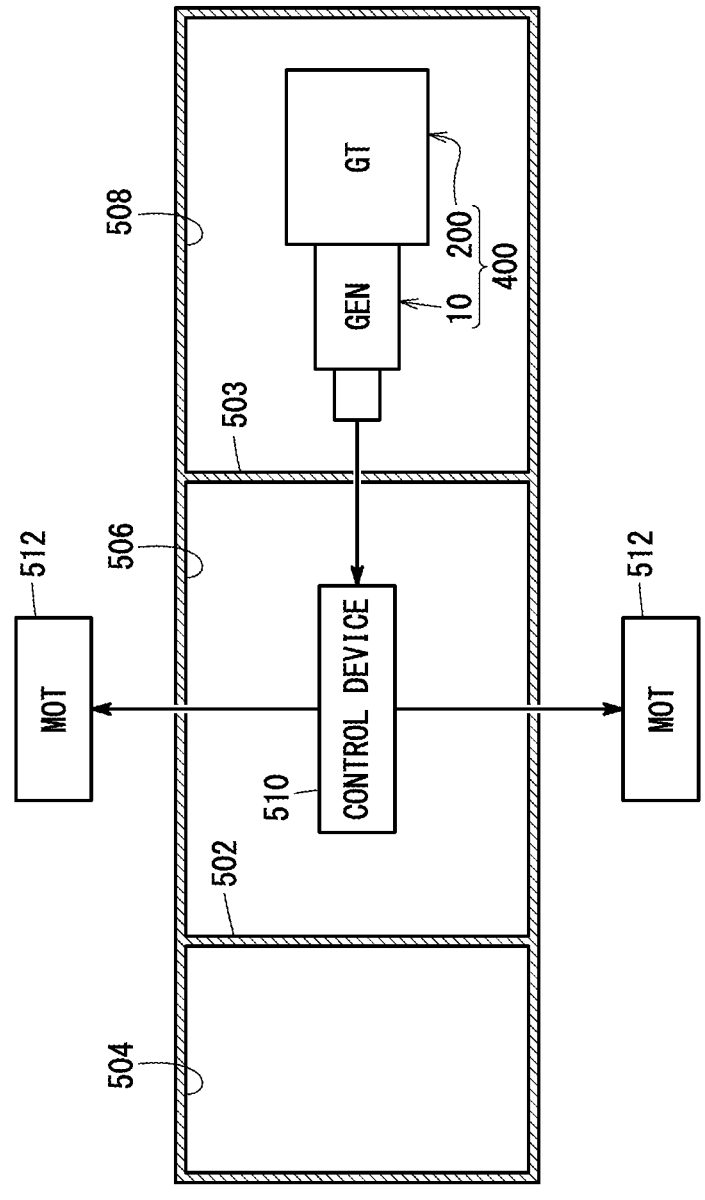
FIG. 1 is a schematic diagram of a flying object equipped with a combined power system.

FIG. 1 is a schematic diagram of a flying object 500. A first partition wall 502 and a second partition wall 503 are provided in the interior of the flying object 500. In the interior of the flying object 500, a passenger compartment 504 and an electrical equipment compartment 506 are separated by the first partition wall 502, and the electrical equipment compartment 506 and an engine compartment 508 are separated by the second partition wall 503. The passenger compartment 504 is occupied by passengers. A control device 510 is provided in the electrical equipment compartment 506. The control device 510 controls a combined power system 400 and motors 512.

The combined power system 400 according to the first embodiment is installed in the engine compartment 508. The combined power system 400 is used as a power engine, for example, in order to cause props or ducted fans (neither of which are shown) to be rotated via the motors 512. More specifically, the combined power system 400 serves as a power engine for providing propulsion in the flying object 500. As a specific example of the flying object 500, there may be cited a multi-copter or the like. As another example of the flying object 500, there may be cited a drone or the like. It is also possible to replace the passenger compartment 504 with a luggage compartment.

Figure 2:
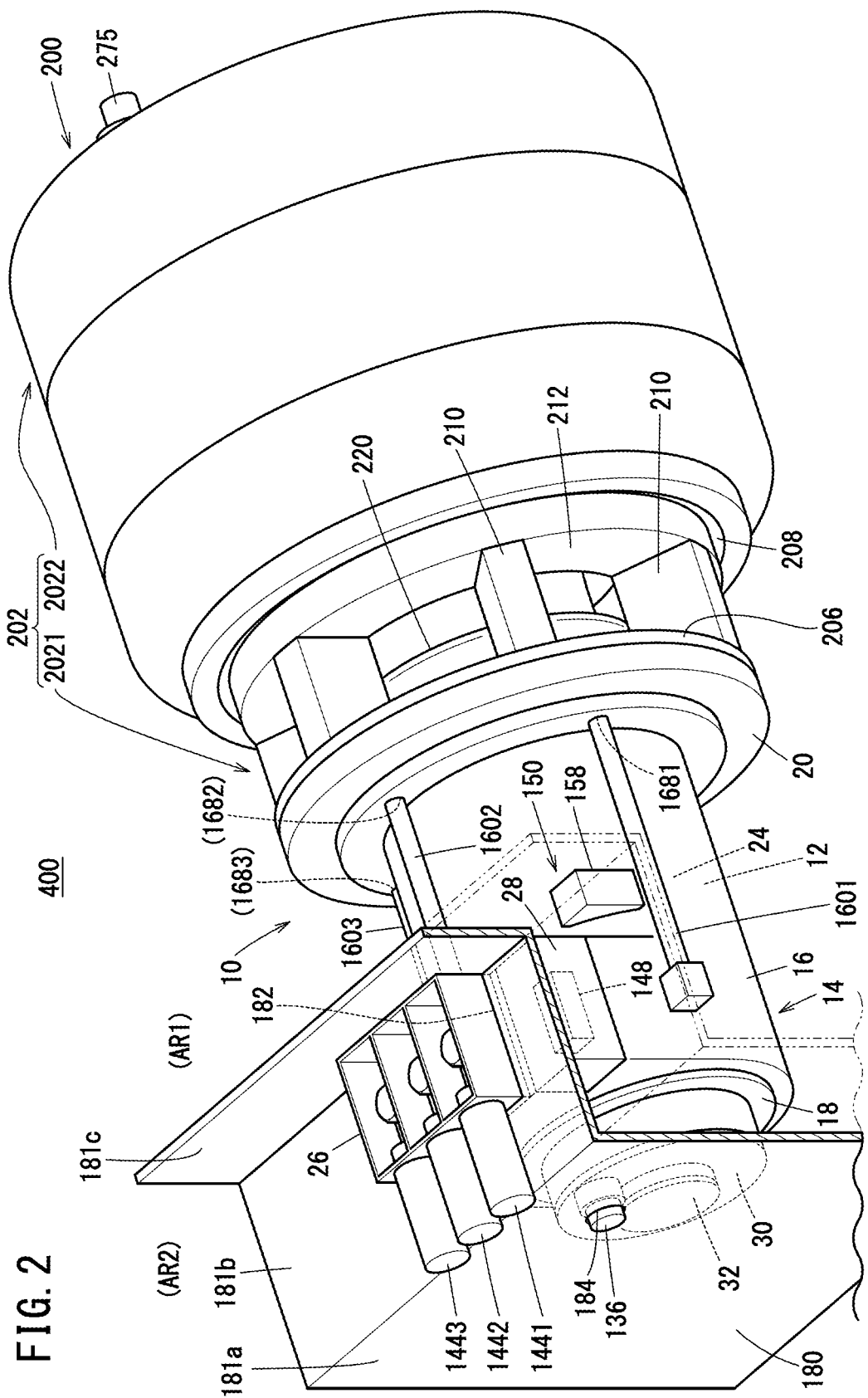
FIG. 2 is a schematic overall perspective view of a combined power system according to a first embodiment of the present invention.

FIG. 2 is a schematic overall perspective view of the combined power system 400. The combined power system 400 is equipped with a rotating electric machine system 10, and a gas turbine engine 200. An axis extending along a longitudinal direction (axial direction) through a diametrical center of the rotating electric machine system 10 coincides with an axis extending along a longitudinal direction (axial direction) through a diametrical center of the gas turbine engine 200. Stated otherwise, the rotating electric machine system 10 and the gas turbine engine 200 are arranged on the same axis.

Hereinafter, the left ends in the axial direction of each of the rotating electric machine system 10 and the gas turbine engine 200 may be referred to as first ends. Similarly, the right ends in the axial direction of each of the rotating electric machine system 10 and the gas turbine engine 200 may be referred to as second ends. More specifically, in the rotating electric machine system 10, a left end part thereof which is separated away from the gas turbine engine 200 is the first end. In the rotating electric machine system 10, a right end part thereof which is in close proximity to the gas turbine engine 200 is the second end. Further, in the gas turbine engine 200, the left end part thereof which is in close proximity to the rotating electric machine system 10 is the first end. In the gas turbine engine 200, the left end part thereof which is separated away from the rotating electric machine system 10 is the second end. According to these definitions, in the illustrated example, the gas turbine engine 200 is disposed at the second end of the rotating electric machine system 10. The rotating electric machine system 10 is disposed at the first end of the gas turbine engine 200.

As will be discussed later, the gas turbine engine 200 is an internal combustion engine. Further, the gas turbine engine 200 serves as a gas supplying device that supplies compressed air.

A rotating electric machine housing 14 includes a main housing 16, a first sub-housing 18, and a second sub-housing 20. The main housing 16 exhibits a generally cylindrical shape, and both a first end and a second end thereof are open ends. The first sub-housing 18 is connected to the first end (the left open end) of the main housing 16. The second sub-housing 20 is connected to the second end (the right open end) of the main housing 16. In the manner described above, the first end and the second end of the main housing 16 are closed.

The main housing 16 has a thick side wall that extends in a left/right direction. An accommodation chamber 22 is formed in the interior of the side wall. The majority of the components of the rotating electric machine 12 are accommodated in the accommodation chamber 22.

A spiral cooling jacket 24 is formed in the interior of the side wall of the main housing 16. A cooling medium flows through the cooling jacket 24. As a specific example of the cooling medium, there may be cited cooling water. In this case, the cooling jacket 24 is a water jacket.

A first casing 26 and a second casing 28 are provided on an edge of the first end on an outer surface (an outer wall) of the side wall of the main housing 16. The first casing 26 and the second casing 28 serve as one portion of the main housing 16. More specifically, the first casing 26 and the second casing 28 are disposed integrally with the main housing 16. As will be discussed later, the first casing 26 is a terminal casing. The second casing 28 is a measuring instrument casing. The material of the first casing 26, the second casing 28, and the first sub-housing 18 is preferably a refractory material (a material having a resistance to heat).

A retaining member that retains the rotational parameter detector is connected to the first sub-housing 18. According to the first embodiment, as the rotational parameter detector, a resolver 132 is exemplified. Accordingly, hereinafter, the retaining member of the rotational parameter detector will be referred to as a "resolver holder 30". As will be discussed later, a cap cover 32 is connected via screws to the resolver holder 30.

The rotating electric machine 12 includes a rotor 34, and a stator 36 that surrounds the outer circumference of the rotor 34.

The rotor 34 includes a rotating shaft 40. The rotating shaft 40 includes an inner shaft 42, and a hollow cylindrical shaped outer shaft 44. Both ends of the outer shaft 44 are open ends. More specifically, the outer shaft 44 has a left open end 441 (refer to FIG. 4) serving as a first outer shaft end part, and a right open end 442 (refer to FIG. 5) serving as a second outer shaft end part. The inner shaft 42 is removably inserted in the interior of the outer shaft 44.

The inner shaft 42 is longer in comparison with the outer shaft 44. The inner shaft 42 includes a cylindrical columnar part 421, a left end part 422 (refer to FIG. 4), and a right end part 423 (refer to FIG. 5). The left end part 422 extends to the left of the cylindrical columnar part 421. Accordingly, the left end part 422 is an end (a first end) of the inner shaft 42 that is separated away from the gas turbine engine 200. The right end part 423 extends to the right of the cylindrical columnar part 421. Accordingly, the right end part 423 is an end (a second end) of the inner shaft 42 that is in close proximity to the gas turbine engine 200. The diameter of the cylindrical columnar part 421 is smaller than the diameter of the left end part 422 and the right end part 423. Further, the diameter of the right end part 423 is smaller than the diameter of the left end part 422.

One portion of the left end part 422 is exposed from the left open end 441 of the outer shaft 44. The portion exposed from the left open end 441 constitutes a projecting distal end 46, which will be described later. Moreover, in the illustrated example, the right end part 423 of the inner shaft 42 and the right open end 442 of the outer shaft 44 are flush with each other. However, the right end part 423 may be positioned slightly closer to the second end from the right open end 442.

Figure 4:
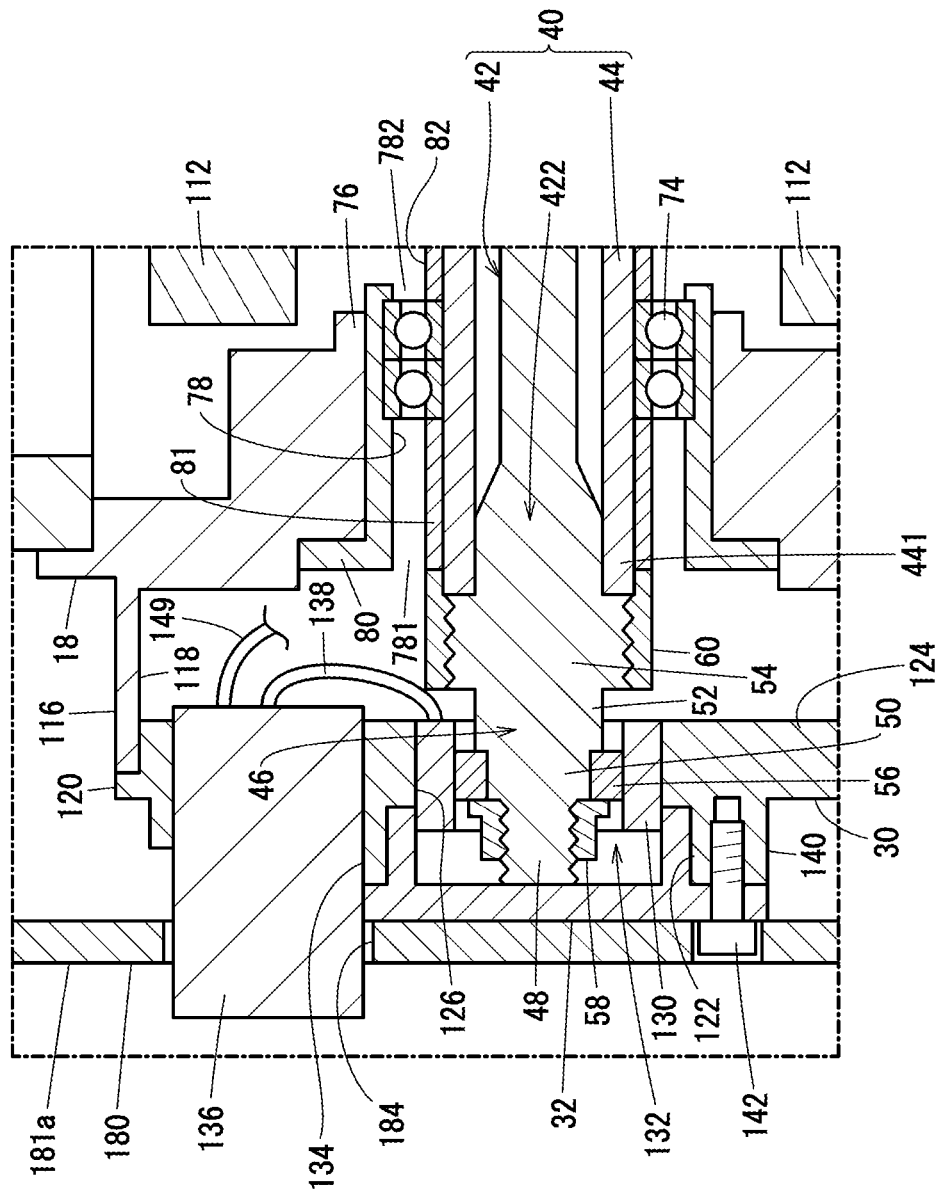
FIG. 4 is an enlarged view of principal components shown in FIG. 3.

As shown in detail in FIG. 4, a first externally threaded portion 48, a flange portion 50, a stopper portion 52, and a second externally threaded portion 54 are provided sequentially in this order toward the right on the left end part 422 of the inner shaft 42. The outer diameters of the first externally threaded portion 48, the flange portion 50, the stopper portion 52, and the second externally threaded portion 54 become larger in this order. The outer diameter of the second externally threaded portion 54 is larger in comparison with the inner diameter of the outer shaft 44. Therefore, the right end of the second externally threaded portion 54 is stopped by the edge of the left open end 441 of the outer shaft 44. Accordingly, in the inner shaft 42, a portion thereof more in the leftward direction than the second externally threaded portion 54 is not inserted into the outer shaft 44.

A resolver rotor 56 is attached to the flange portion 50. Further, a small cap nut 58 is screw-engaged with the first externally threaded portion 48. A right end of the resolver rotor 56 is stopped by the stopper portion 52. A left end of the resolver rotor 56 is pressed by the small cap nut 58. Due to the above-described features, the resolver rotor 56 is positioned and fixed to the flange portion 50.

Further, a large cap nut 60 is screwed-engaged with the second externally threaded portion 54. A right end of the large cap nut 60 covers an outer circumferential wall of the left open end 441 of the outer shaft 44. In accordance with this feature, the left end part 422 of the inner shaft 42 is restrained by the left open end 441 of the outer shaft 44. Moreover, the first externally threaded portion 48 and the second externally threaded portion 54 are so-called reverse threads. Accordingly, when screw-engaged, the small cap nut 58 and the large cap nut 60 are rotated counterclockwise. After being screw-engaged, it is preferable to partially deform the screw threads of the small cap nut 58 and the large cap nut 60. In accordance with this feature, the small cap nut 58 and the large cap nut 60 are prevented from becoming loosened.

Figure 5:
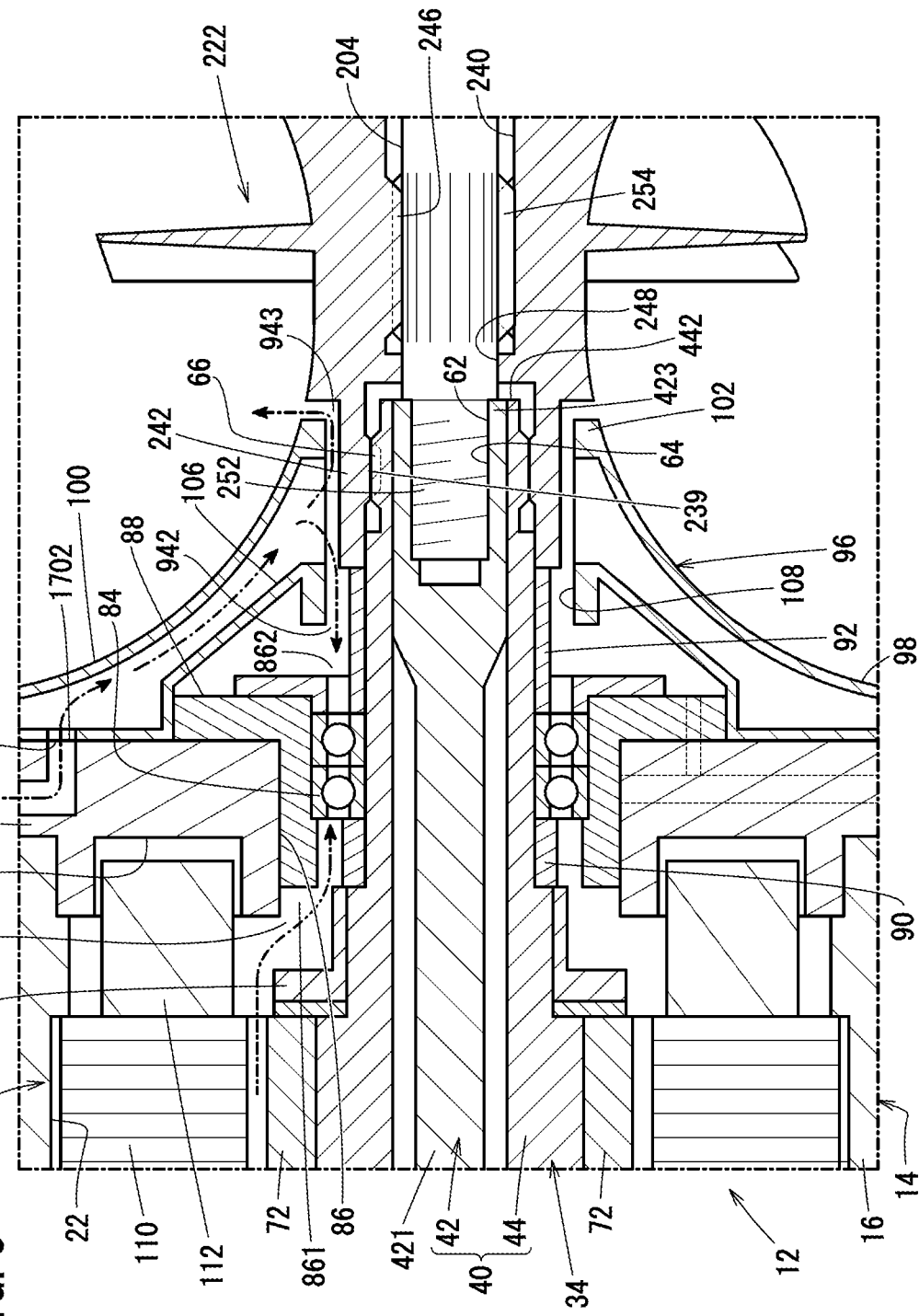
FIG. 5 is an enlarged view of principal components shown in FIG. 4 at a location different from that shown in FIG. 3.

As shown in FIG. 5, a connecting hole 62 is formed in the right end part 423 which is the second end of the inner shaft 42. The connecting hole 62 extends toward the left end part 422 which is the first end. A female screw portion 64 is engraved on an inner circumferential wall of the connecting hole 62. The left end of an output shaft 204 is inserted into the connecting hole 62. The left end of the output shaft 204 is coupled to the inner shaft 42 by being screw-engaged with the female screw portion 64. A compressor wheel 222 and a turbine wheel 224 (refer to FIG. 8) are retained on the output shaft 204.

Further, a first inner spline 66 is formed on the outer circumferential wall of the right open end 442 of the outer shaft 44. The first inner spline 66 extends along the axial direction (left/right direction) of the rotating electric machine system 10.

Figure 3:
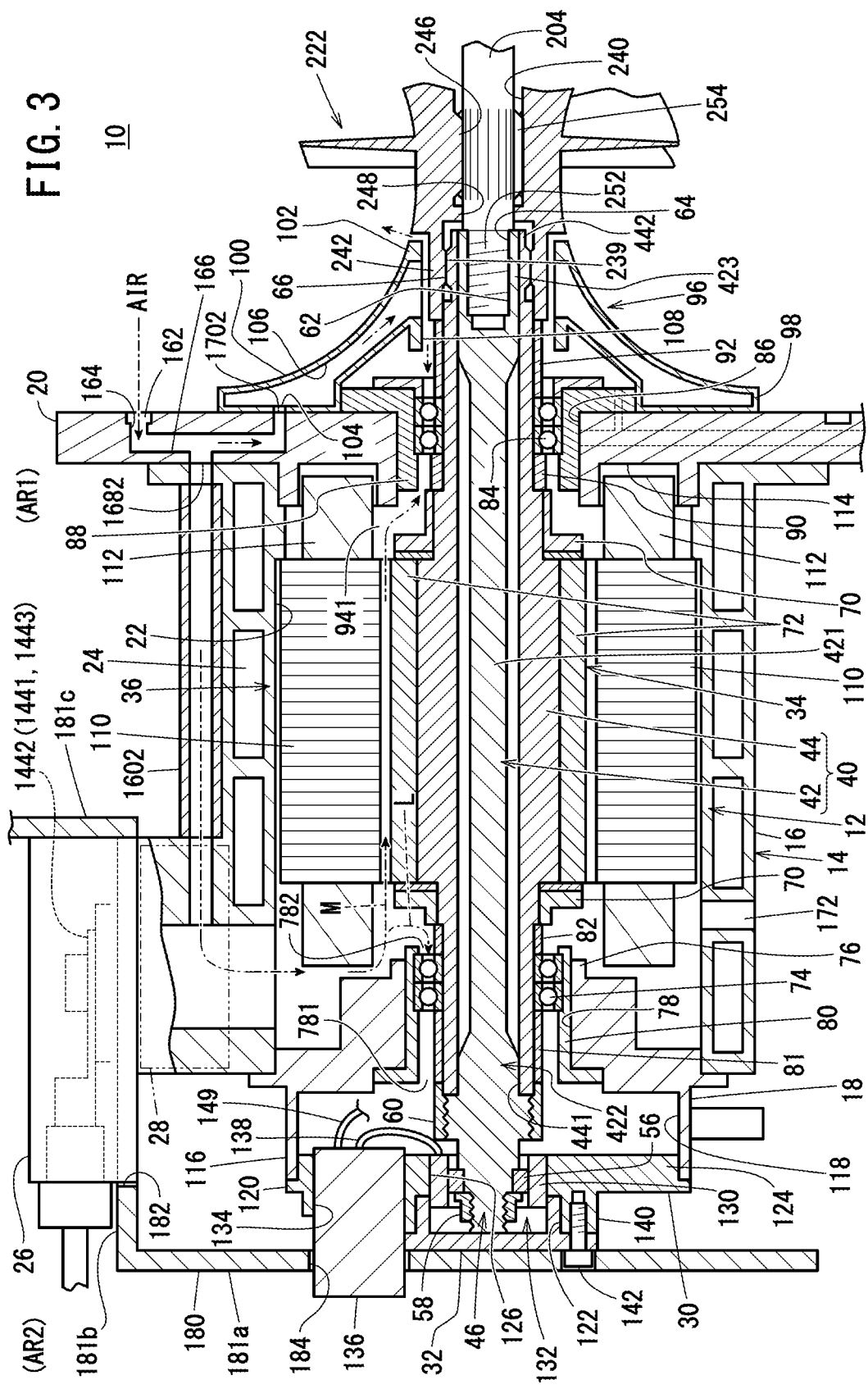
FIG. 3 is a schematic side cross-sectional view of a rotating electric machine system according to the first embodiment of the present invention.

As shown in FIG. 3, the outer diameter of the outer shaft 44 is maximum at a substantially central portion in the longitudinal direction. A plurality of permanent magnets 72 are retained via magnet holders 70 on the large diameter central portion. In the permanent magnets 72 that are adjacent to each other, polarities thereof which are different from each other face outward. As the rotating shaft 40 undergoes rotation, the permanent magnets 72 move along a circumference of a predetermined virtual circle about the center of rotation of the rotating shaft 40.

A left end (first end part) of the rotating shaft 40 is rotatably supported in the first sub-housing 18 via a first bearing 74. As shown in FIG. 3, the first bearing 74 is inserted between the outer shaft 44 and the first sub-housing 18. Specifically, the first sub-housing 18 includes a columnar shaped projecting portion 76 that is projected out toward the main housing 16. A first insertion hole 78 is formed in the columnar shaped projecting portion 76. A first bearing holder 80 by which the first bearing 74 is retained is inserted into the first insertion hole 78. Accordingly, the first bearing 74 is arranged in the first insertion hole 78.

The first insertion hole 78 extends along the left/right direction. The left end of the first insertion hole 78 is separated farther away from the output shaft 204 than the right end of the first insertion hole 78. Hereinafter, the left end of the first insertion hole 78 may also be referred to as a "first distal end 781". On the other hand, the right end of the first insertion hole 78 is in closer proximity to the output shaft 204 than the left end (the first distal end 781) of the first insertion hole 78. Hereinafter, the right end of the first insertion hole 78 may also be referred to as a "first proximal end 782".

A first outer stopper 81 positioned at the first distal end 781, and a first inner stopper 82 positioned at the first proximal end 782 are installed on a small diameter left end of the outer shaft 44. The first bearing 74 is sandwiched between the first outer stopper 81 and the first inner stopper 82. Based on being sandwiched in this manner, the first bearing 74 is positioned and fixed in place. A clearance is formed between the first outer stopper 81 and the columnar shaped projecting portion 76.

The distal end of the left end part of the rotating shaft 40 passes through the first insertion hole 78 after having passed through an inner hole of the first bearing 74. The distal end of the left end part of the rotating shaft 40 is further exposed on an outer side (a hollow concave portion 118) of the columnar shaped projecting portion 76. Hereinafter, the portion of the rotating shaft 40 that is projected out from the left end of the first bearing 74 is referred to as a "projecting distal end 46". Within the left end part 422 of the inner shaft 42, the first externally threaded portion 48, the flange portion 50, the stopper portion 52, and the second externally threaded portion 54 are included on the projecting distal end 46 (refer to FIG. 4).

A right end part (second end part) of the rotating shaft 40 is rotatably supported in the second sub-housing 20 via a second bearing 84. As shown in FIG. 5, the second bearing 84 is inserted between the outer shaft 44 and the second sub-housing 20 which exhibits a substantially disk shape.

The second sub-housing 20 is connected to the main housing 16 via non-illustrated bolts. The center of the second sub-housing 20 is in the form of a thick-walled cylindrical shaped portion. A second insertion hole 86 is formed in such a cylindrical shaped portion. The second insertion hole 86 extends along the left/right direction. The left end of the second insertion hole 86 is separated farther away from the output shaft 204 than the right end of the second insertion hole 86. Hereinafter, the left end of the second insertion hole 86 may also be referred to as a "second distal end 861". On the other hand, the right end of the second insertion hole 86 is in closer proximity to the output shaft 204 than the left end (the second distal end 861) of the second insertion hole 86. Hereinafter, the right end of the second insertion hole 86 may also be referred to as a "second proximal end 862".

A second bearing holder 88 by which the second bearing 84 is retained is inserted into the second insertion hole 86. Accordingly, the second bearing 84 is arranged in the second insertion hole 86. The second bearing 84 is sandwiched between a second inner stopper 90 positioned at the second distal end 861, and a second outer stopper 92 positioned at the second proximal end 862. Based on being sandwiched in this manner, the second bearing 84 is positioned and fixed in place.

Further, at the second distal end 861, a clearance is formed between the second inner stopper 90 and the second bearing holder 88. This clearance defines a first sub-branching passage 941.

In the second sub-housing 20, a rectifying member 96 is connected to the end surface thereof that faces toward the gas turbine engine 200. The rectifying member 96 includes a base portion 98, a reduced diameter portion 100, and a top portion 102. The base portion 98 which faces toward the second sub-housing 20 has a large diameter and a thin cylindrical plate shape. The top portion 102 which faces toward the gas turbine engine 200 has a small diameter and a relatively long cylindrical plate shape. In the reduced diameter portion 100 between the base portion 98 and the top portion 102, the diameter thereof gradually becomes smaller. Accordingly, the rectifying member 96 is a chevron shaped body or a bottomless cup shaped body. The outer surface of the reduced diameter portion 100 is a smooth surface with a small surface roughness.

In the base portion 98, inlet ports 104 are formed in an end surface thereof that faces toward the second sub-housing 20. Further, the reduced diameter portion 100 is hollow. More specifically, a relay chamber 106 is formed in the interior of the reduced diameter portion 100. The inlet ports 104 serve as inlet ports for the compressed air to enter into the relay chamber 106.

An insertion hole 108 is formed in the top portion 102 along the left/right direction. A diameter (an opening diameter) of the insertion hole 108 is larger than the outer diameter of a portion of the second outer stopper 92 that extends along the rotating shaft 40. Therefore, a portion of the second outer stopper 92 that has entered into the insertion hole 108 and the outer circumferential wall is separated away from the inner wall of the insertion hole 108. Stated otherwise, a clearance is formed between the outer circumferential wall of the second outer stopper 92 and the inner wall of the insertion hole 108. This clearance defines a second sub-branching passage 942. The relay chamber 106 becomes wider as it comes closer in proximity to the insertion hole 108 and the second sub-branching passage 942.

Further, in the compressor wheel 222, the diameter (opening diameter) of the insertion hole 108 is larger than the outer diameter of the relatively small left end (a small diameter cylindrical portion 242). Therefore, the small diameter cylindrical portion 242 that has entered into the insertion hole 108 is also separated away from the inner wall of the insertion hole 108. Stated otherwise, a clearance is formed between the small diameter cylindrical portion 242 and the inner wall of the insertion hole 108. This clearance defines an outlet passage 943.

As shown in FIG. 3, the first insertion hole 78 and the first sub-branching passage 941 communicate with the accommodation chamber 22. Therefore, the first bearing 74 and the second bearing 84 are exposed in the accommodation chamber 22.

The stator 36 constitutes the rotating electric machine 12 together with the aforementioned rotor 34. The stator 36 includes an electromagnetic coil 110 and a plurality of insulating substrates 112. The electromagnetic coil 110 comprises three types of coils, including a U-phase coil, a V-phase coil, and a W-phase coil, and is wound around the insulating substrates 112. In the case that the rotating electric machine 12 is a generator, the rotating electric machine 12 is a so-called three-phase power source. The plurality of insulating substrates 112 are arranged in an annular shape. Due to being arranged in this manner, an inner hole is formed in the stator 36.

The stator 36 is accommodated in the accommodation chamber 22. In this instance, the second sub-housing 20 fulfills a role as a stator holder. More specifically, an annular concave portion 114 is formed in the second sub-housing 20. The insulating substrates 112 included in the stator 36 are engaged with the annular concave portion 114. Due to such engagement, the stator 36 is positioned and fixed in place. Furthermore, the columnar shaped projecting portion 76 enters into a left opening of the inner hole of the stator 36.

The inner wall of the accommodation chamber 22 and the electromagnetic coil 110 are slightly separated away from each other. Due to being separated in this manner, the main housing 16 and the electromagnetic coil 110 are electrically insulated.

A clearance is formed between the outer circumferential wall of the columnar shaped projecting portion 76 and the insulating substrates 112. A clearance is also formed between the outer walls of the permanent magnets 72 and the inner wall of the electromagnetic coil 110. As will be discussed later, the compressed air, which is a gas, flows through these clearances. Stated otherwise, these clearances make up one part of a compressed air flow passage.

As shown in FIG. 3, the first sub-housing 18 includes an annular convex portion 116 that projects out in an annular shape. The hollow concave portion 118 is formed on an inner side of the annular convex portion 116. The projecting distal end 46, which is one portion of the left end part 422 of the inner shaft 42, enters into the hollow concave portion 118.

The resolver holder 30 is provided on the annular convex portion 116. The resolver holder 30 has a flange shaped stopper 120 that is projected out toward the diametrical direction. The flange shaped stopper 120 is larger in diameter than an inner diameter of the annular convex portion 116. Accordingly, the flange shaped stopper 120 abuts against the annular convex portion 116. Due to abutting in this manner, the resolver holder 30 is positioned. In this state, the resolver holder 30 is connected to the first sub-housing 18, for example, via mounting bolts (not shown).

A small cylindrical portion 122 is provided in the resolver holder 30 on a left side of the flange shaped stopper 120. Further, a large cylindrical portion 124 is provided on a right side of the flange shaped stopper 120. The large cylindrical portion 124 is larger in diameter than the small cylindrical portion 122. A retaining hole 126 is formed in the resolver holder 30. A major portion of a resolver stator 130 is fitted into the retaining hole 126. Due to being fitted therein in this manner, the resolver stator 130 is retained by the resolver holder 30.

At a time when the large cylindrical portion 124 enters into the hollow concave portion 118 and the flange shaped stopper 120 has come into abutment against the annular convex portion 116, the resolver rotor 56 is positioned in the inner hole of the resolver stator 130. The resolver 132 is constituted by the resolver stator 130, the resolver rotor 56, and a transmission connector 136, which will be described later. The resolver 132 serves as the rotational parameter detector. According to the first embodiment, the resolver 132 detects an angle of rotation of the inner shaft 42. Moreover, as noted previously, the resolver rotor 56 is retained by the flange portion 50 on the left end part 422 of the inner shaft 42.

An engagement hole 134 is formed in the flange shaped stopper 120. The transmission connector 136 is engaged with the engagement hole 134. The resolver stator 130 and the transmission connector 136 are electrically connected via a signal line 138. A first end of the transmission connector 136 is exposed from the engagement hole 134. A connector hole (not shown) is provided on the end surface of the first end. Moreover, a reception connector of a receiver (not shown) is inserted into a connector hole. More specifically, a first end of the transmission connector 136 is a connector connecting portion. As a result of inserting the reception connector into the connector hole, the resolver 132 and the receiver are electrically connected via the transmission connector 136 and the reception connector. The receiver receives signals emitted by the resolver 132.

A plurality of tab portions 140 are provided on the small cylindrical portion 122. An individual one of the tab portions 140 is shown in FIG. 3. Moreover, it should be noted that the tab portions 140 are omitted from being shown in FIG. 2. Furthermore, the small cylindrical portion 122 is covered by the cap cover 32. The cap cover 32 closes a left opening of the small cylindrical portion 122, and shields the left end part 422 of the inner shaft 42. Moreover, it should be noted that the cap cover 32 is connected to the tab portions 140 via connecting bolts 142.

Figure 6:
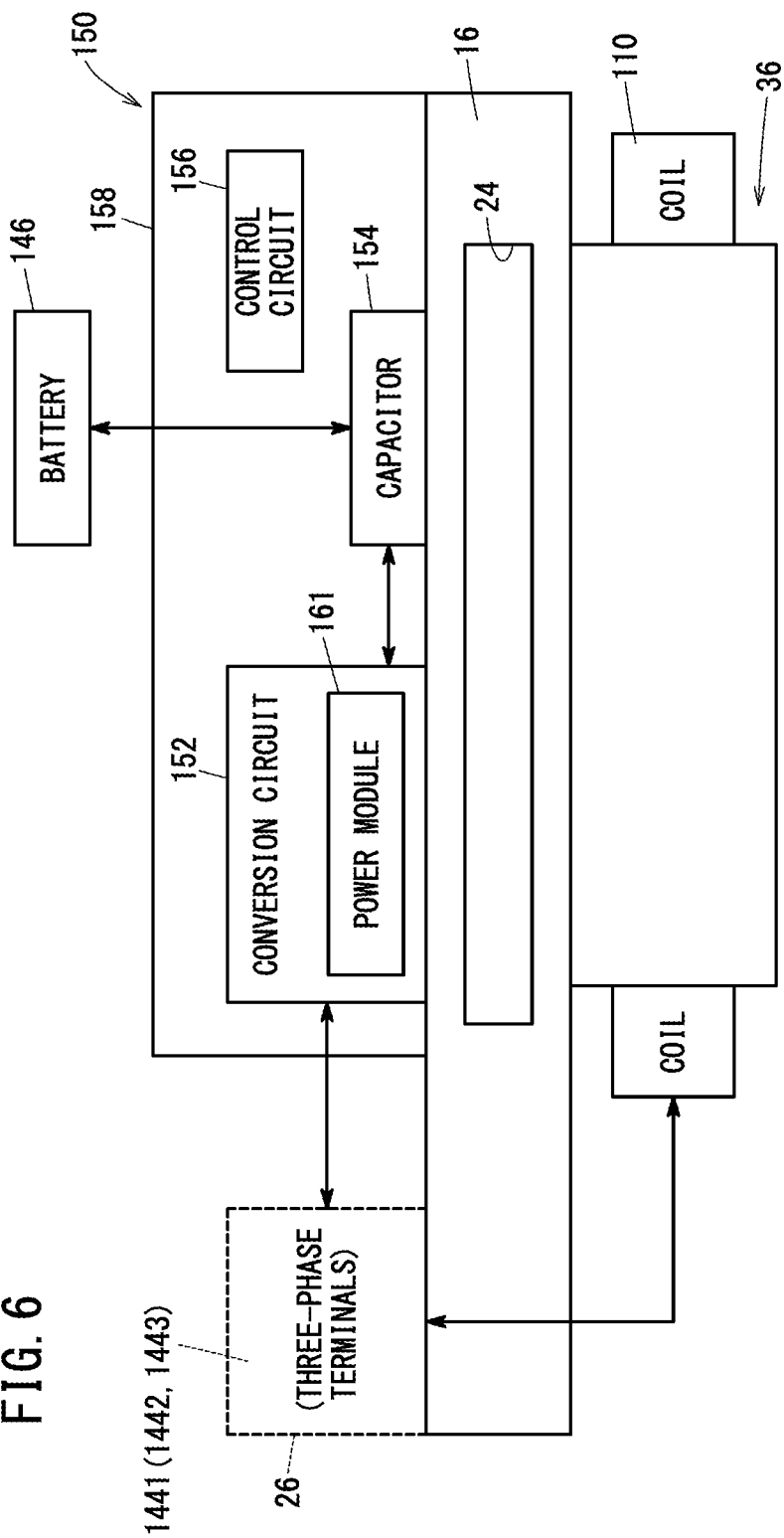
FIG. 6 is a schematic configuration diagram of a current converter provided in a rotating electric machine housing.

As noted previously, in the first sub-housing 18, the first casing 26 and the second casing 28 are integrally provided at the first end (refer to FIG. 2). A U-phase terminal 1441, a V-phase terminal 1442, and a W-phase terminal 1443 are accommodated in the first casing 26. The U-phase terminal 1441 is electrically connected to a U-phase coil within the electromagnetic coil 110. The V-phase terminal 1442 is electrically connected to a V-phase coil within the electromagnetic coil 110. The W-phase terminal 1443 is electrically connected to a W-phase coil within the electromagnetic coil 110. The U-phase terminal 1441, the V-phase terminal 1442, and the W-phase terminal 1443 are electric terminal portions to which an external device (an external load or an external power source) is electrically connected. Electrical power generated by the rotating electric machine 12 is supplied to the external device. As the external load, for example, there may be cited the motors 512. Further, as the external device, for example, there may be cited a battery 146 as shown in FIG. 6.

The second casing 28 is adjacent to the first casing 26. A thermistor 148, which serves as a temperature measurement device, is accommodated in the second casing 28. Although not illustrated in particular, measurement terminals of the thermistor 148 are connected to the electromagnetic coil 110 after having been drawn out from the second casing 28. The thermistor 148 detects (measures) the temperature of the electromagnetic coil 110. The temperature is a parameter other than the rotational parameter. A harness 149 is electrically connected to the thermistor 148. The harness 149 is connected to the transmission connector 136 that constitutes part of the resolver 132 in the interior of the first sub-housing 18.

An internal space of the first casing 26 is in communication with the accommodation chamber 22. Further, the internal space of the second casing 28 and the internal space of the first casing 26 may be placed in communication with each other through a non-illustrated mutual communication hole.

As shown in FIG. 2, a current converter 150 is disposed on the outer circumferential wall of the main housing 16. The current converter 150 is located in closer proximity to the gas turbine engine 200 than the first casing 26. As shown in FIG. 6, the current converter 150 includes a conversion circuit 152, a capacitor 154, and a control circuit 156. The conversion circuit 152, the capacitor 154, and the control circuit 156 are accommodated inside a device case 158. The device case 158 is arranged, for example, on the outer circumferential wall of the main housing 16 at a location that does not interfere with a first hollow tube portion 1601, a second hollow tube portion 1602, and a third hollow tube portion 1603 (refer to FIG. 2).

The hollow interiors of the first hollow tube portion 1601, the second hollow tube portion 1602, and the third hollow tube portion 1603 are relay communication passages through which the compressed air flows. More specifically, according to the first embodiment, three individual ones of such relay communication passages are formed in the rotating electric machine housing 14.

The conversion circuit 152 includes a power module 161. The conversion circuit 152 converts an AC current generated by the electromagnetic coil 110 into a DC current. At this time, the capacitor 154 temporarily stores the DC current converted by the conversion circuit 152 as an electric charge. The conversion circuit 152 also possesses a function of converting the DC current delivered from the battery 146 into an AC current. In this case, the capacitor 154 temporarily stores the DC current delivered from the battery 146 toward the electromagnetic coil 110 as an electric charge.

The control circuit 156 controls a current density or the like of the DC current that flows from the capacitor 154 toward the battery 146, or the DC current that flows in the opposite direction. Moreover, the DC current from the battery 146 is supplied to the motors 512, for example, via an AC-DC converter (not shown).

A compressed air flow passage is provided in the rotating electric machine system 10 which is constituted in the manner described above. A description will now be given concerning such a compressed air flow passage.

Figure 7:
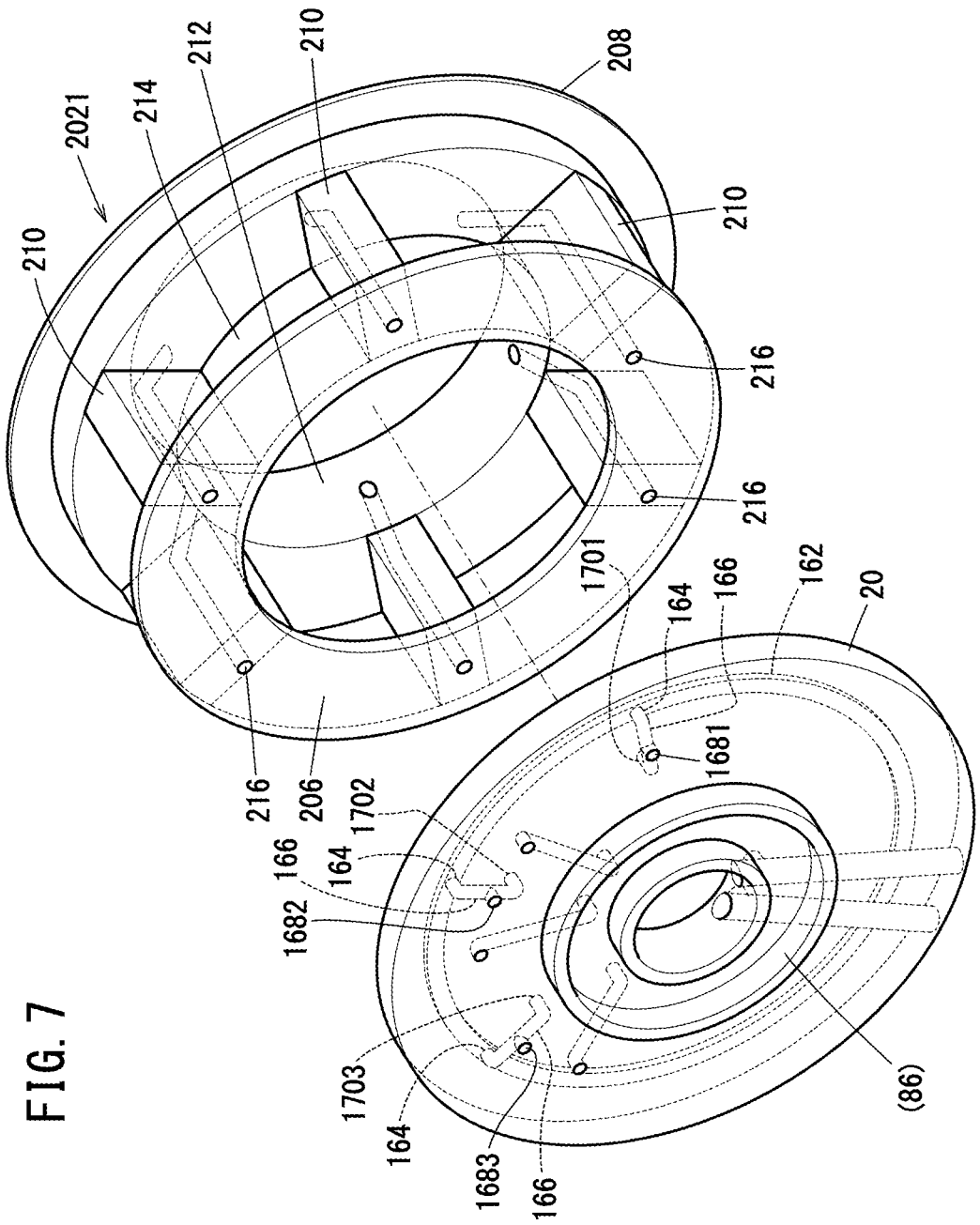
FIG. 7 is a schematic perspective view of a second sub-housing that constitutes part of the rotating electric machine housing, and an inner housing in an engine housing.

As shown in FIG. 7, in the second sub-housing 20, on an end surface thereof that faces toward the gas turbine engine 200, an annular shaped collection flow passage 162 is formed therein as an annular concave portion. As will be discussed later, a portion of the compressed air generated by the gas turbine engine 200 flows through the collection flow passage 162. Three upstream communication holes 164 are formed in a bottom wall of the collection flow passage 162 (the annular concave portion). The upstream communication holes 164 serve as input ports for the compressed air.

Air relay paths 166 are provided in the interior of the second sub-housing 20. The air relay paths 166 extend radially along a diametrical direction of the second sub-housing 20. The air relay paths 166 communicate on a diametrical outward side with the collection flow passage 162 via the upstream communication holes 164. Further, in the second sub-housing 20, three first downstream communication holes 1681 to 1683 are formed in an end surface thereof that faces toward the rotating electric machine 12. The first downstream communication holes 1681 to 1683 serve as first output ports of the air relay paths 166. A distribution passage is formed by the collection flow passage 162 and the air relay paths 166.

In the second sub-housing 20, three second downstream communication holes 1701 to 1703 are formed in an end surface thereof that faces toward the gas turbine engine 200. The second downstream communication holes 1701 to 1703 serve as second output ports of the air relay paths 166. The second downstream communication holes 1701 to 1703 are positioned more radially inward in a diametrical direction than the first downstream communication holes 1681 to 1683. Accordingly, the compressed air that flows through the air relay paths 166 is divided into compressed air that enters into the first downstream communication holes 1681 to 1683, and compressed air that enters into the second downstream communication holes 1701 to 1703.

As shown in FIG. 2, the first hollow tube portion 1601 through the third hollow tube portion 1603 are provided on the outer surface of the side wall of the main housing 16. The first downstream communication holes 1681 to 1683 open respectively into the first hollow tube portion 1601 through the third hollow tube portion 1603. As can be understood from this feature, the air relay paths 166 place the collection flow passage 162 in communication with the hollow interiors of the first hollow tube portion 1601 through the third hollow tube portion 1603. As shown in FIG. 3, the first hollow tube portion 1601 through the third hollow tube portion 1603 are positioned diametrically outward of the cooling jacket 24 that is formed on the side wall interior of the main housing 16.

The first hollow tube portion 1601 through the third hollow tube portion 1603 extend along the axial direction of the main housing 16. The hollow interiors of the first hollow tube portion 1601 through the third hollow tube portion 1603 communicate respectively with the accommodation chamber 22 of the main housing 16. Accordingly, the compressed air that has flowed through the hollow interiors of the first hollow tube portion 1601 through the third hollow tube portion 1603 flows respectively into the accommodation chamber 22 of the main housing 16. The accommodation chamber 22 makes up a portion of the first flow passage.

As noted previously, the accommodation chamber 22 and the internal space of the first casing 26 communicate with each other via a communication passage 196 (in particular, refer to FIG. 4). Accordingly, a portion of the compressed air that has flowed into the accommodation chamber 22 (one part of the first flow passage) flows through the communication passage 196 into the internal space (the second flow passage) of the first casing 26. Further, in the case that the internal space of the first casing 26 and the internal space of the second casing 28 are placed in communication via the mutual communication hole, the compressed air that has flowed into the internal space of the first casing 26 passes through the communication hole and flows into the second casing 28.

In the first embodiment, although a case is exemplified in which the first hollow tube portion 1601 through the third hollow tube portion 1603 are provided, the number of the hollow tube portions is appropriately determined in accordance with a flow rate or a flow velocity required for air curtains to be formed from the compressed air. More specifically, the number of the hollow tube portions is not limited to being three. Further, in a similar manner, the cross-sectional area of the hollow tube portions is appropriately determined in accordance with the flow rate or the flow velocity required to form the air curtains.

The compressed air that has flowed into the accommodation chamber 22 is thereafter divided into compressed air that is directed toward the first insertion hole 78, and compressed air that is directed toward the second insertion hole 86. Specifically, a portion of the compressed air flows through a clearance between the first sub-housing 18 and the rotor 34 and toward the first insertion hole 78. In this manner, the clearance between the first sub-housing 18 and the rotor 34 forms a first branching passage L. On the other hand, a remaining portion of the compressed air primarily flows through a clearance between the outer walls of the permanent magnets 72 and the inner wall of the electromagnetic coil 110 and toward the second insertion hole 86. In this manner, the clearance between the outer walls of the permanent magnets 72 and the inner wall of the electromagnetic coil 110 forms a second branching passage M. The first branching passage L, the second branching passage M, and the first sub-branching passage 941 form the first flow passage.

The compressed air that has reached the first branching passage L forms an air curtain which seals the lubricating oil supplied to the first bearing 74. Further, the compressed air that has reached the first sub-branching passage 941 (the second distal end 861 of the second insertion hole 86) from the second branching passage M forms an air curtain which seals the lubricating oil supplied to the second bearing 84. In this manner, the compressed air that has flowed into the accommodation chamber 22 functions as the air curtains.

As shown in FIG. 5, the three individual inlet ports 104 are formed in the base portion 98 of the rectifying member 96. An individual one of the inlet ports is shown in FIG. 5.

An individual one of the inlet ports 104 extends to the second downstream communication hole 1701 (not shown). Another individual one of the inlet ports 104 extends to the second downstream communication hole 1702 (not shown). Further, another individual one of the inlet ports 104 extends to the second downstream communication hole 1703 (not shown). Accordingly, the compressed air output from the second downstream communication holes 1701 to 1703 enters into the relay chamber 106 of the reduced diameter portion 100 of the rectifying member 96 via the inlet ports 104.

The relay chamber 106 extends to the insertion hole 108 that is formed in the top portion 102. In this instance, the relay chamber 106 becomes wider as it comes closer in proximity to the insertion hole 108 and the second sub-branching passage 942. Therefore, as the compressed air flows through the relay chamber 106, the pressure of the compressed air decreases.

The outlet of the relay chamber 106 faces toward the small diameter cylindrical portion 242 of the compressor wheel 222. Accordingly, the compressed air that has entered into the relay chamber 106 comes into contact with the small diameter cylindrical portion 242 of the compressor wheel 222. Thereafter, the compressed air is divided into compressed air that is directed toward the second sub-branching passage 942, and compressed air that is directed toward the outlet passage 943. As a result, the pressure of the compressed air that flows along the second sub-branching passage 942 and toward the second proximal end 862 of the second insertion hole 86 is reduced.

The compressed air that has reached the second proximal end 862 of the second insertion hole 86 from the second sub-branching passage 942 forms an air curtain which seals the lubricating oil supplied to the second bearing 84. Further, the compressed air that has flowed into the outlet passage 943 is discharged in an inward direction from a first end (an open end) in a shroud case 220. The compressed air is drawn back again to the compressor wheel 222.

An exhaust path 172 (a first exhaust path) is formed in the main housing 16. The compressed air that has reached the first branching passage L and the compressed air that has reached the second branching passage M are discharged to the exterior of the main housing 16 through the exhaust path 172.

As shown in FIGS. 2 to 4, the rotating electric machine system 10 is equipped with a fire prevention member 180. In the first embodiment, the fire prevention member 180 is a wall that is made up from a fire resistant material. The fire prevention member 180 is supported by the rotating electric machine housing 14 via a non-illustrated support column. Alternatively, the fire prevention member 180 is supported via a non-illustrated support member on the inner wall of the engine compartment 508.

By the fire prevention member 180, the engine compartment 508 is divided into a first region AR1 in which the combined power system 400 (the rotating electric machine system 10 and the gas turbine engine 200) is positioned, and a second region AR2 in which the combined power system 400 is not positioned. As noted previously, the fire prevention member 180 is made up from a fire resistant material. Accordingly, the second region AR2 is protected as a fire prevention region.

The fire prevention member 180 includes a first vertical portion 181a, a horizontal portion 181b, and a second vertical portion 181c. As shown in FIG. 2 and FIG. 3, a first insertion hole 182 is formed in the horizontal portion 181b, and a second insertion hole 184 is formed in the first vertical portion 181a.

The first vertical portion 181a is a vertical wall that extends upwardly from a downward location in close proximity to the resolver holder 30 and the first sub-housing 18. The first vertical portion 181a covers the first sub-housing 18 which is positioned at a first end of the rotating electric machine housing 14. As can be understood from this feature, the fire prevention member 180 shields the first end of the rotating electric machine system 10.

A first end of the transmission connector 136 is passed through the second insertion hole 184 that is formed in the first vertical portion 181a. Specifically, the first end of the transmission connector 136 is passed through the second insertion hole 184 and exposed in the second region AR2. In the transmission connector 136, an arbitrary site such as an intermediate portion (or a second end) thereof is positioned inside the second insertion hole 184. Accordingly, the transmission connector 136 is engaged with the second insertion hole 184. The opening dimension of the second insertion hole 184 is substantially the same as the outer dimension of the transmission connector 136. Therefore, a gap between the second insertion hole 184 and the transmission connector 136 is on the order of 1 mm or less, which is so small that it can be ignored. Stated otherwise, the second insertion hole 184 is closed by the transmission connector 136.

Signals flow via the transmission connector 136 through the signal line 138 and the harness 149. More specifically, according to the first embodiment, the signals can be exchanged between the resolver 132 and the thermistor 148 and the control device 510, while the signal line 138 and the harness 149 are protected inside the first sub-housing 18.

The horizontal portion 181b is bent substantially perpendicularly with respect to the first vertical portion 181a, and extends slightly from the first end toward a second end of the rotating electric machine housing 14. The second vertical portion 181c is bent substantially perpendicularly with respect to the horizontal portion 181b, and extends upwardly from a downward location.

The first casing 26 is passed through the first insertion hole 182 that is formed in the horizontal portion 181b. Specifically, the first casing 26 passes through the first insertion hole 182 and is exposed in the second region AR2. The first casing 26 projects out upwardly from the first insertion hole 182. A lower portion of the first casing 26 is positioned within the first insertion hole 182. Accordingly, the first casing 26 is engaged with the first insertion hole 182. The width of the first insertion hole 182 (a dimension in a direction perpendicular to the X direction and the Y direction) is substantially the same as the outer dimension of the first casing 26. Therefore, a gap between the first insertion hole 182 and the first casing 26 is on the order of 1 mm or less, which is so small that it can be ignored. Stated otherwise, the first insertion hole 182 is closed by the first casing 26.

Figure 8:
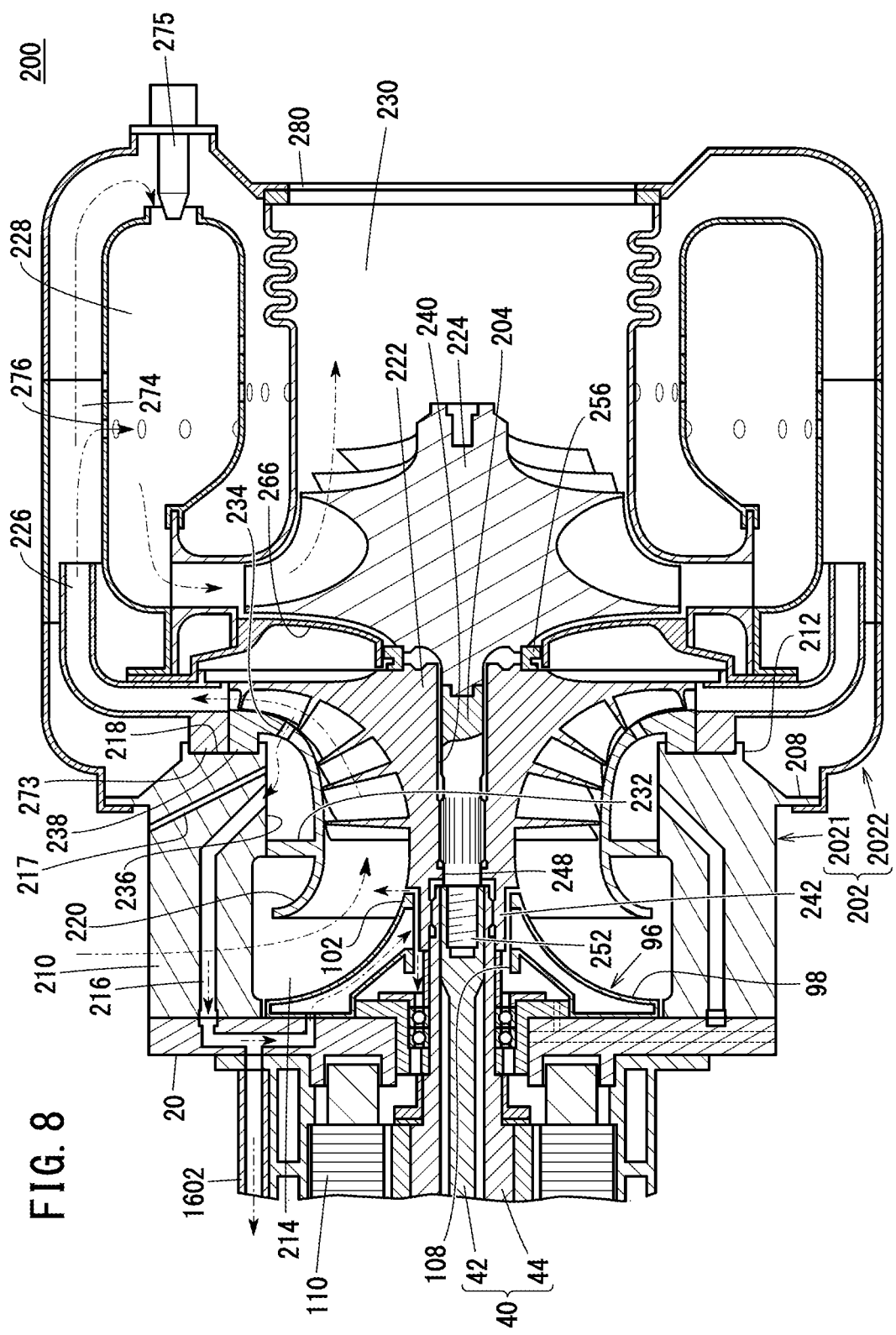
FIG. 8 is a schematic side cross-sectional view of a gas turbine engine constituting part of the combined power system.

Next, a description will be given concerning the gas turbine engine 200. As shown in FIG. 8, the gas turbine engine 200 comprises an engine housing 202, and the output shaft 204 that rotates inside the engine housing 202. The engine housing 202 includes an inner housing 2021 and an outer housing 2022. The inner housing 2021 is connected to the second sub-housing 20 of the rotating electric machine system 10. The outer housing 2022 is connected to the inner housing 2021. The outer housing 2022 forms a housing main body.

As shown in FIG. 2 and FIG. 7, the inner housing 2021 includes a first annular portion 206, a second annular portion 208, and a plurality of individual leg members 210. The first annular portion 206 is connected to the second sub-housing 20. The diameter of the second annular portion 208 is greater than the diameter of the first annular portion 206. The leg members 210 connect the first annular portion 206 and the second annular portion 208. In the illustrated example, the number of the leg members 210 is six. However, the number of the leg members 210 is determined in accordance with the necessary coupling strength required between the gas turbine engine 200 and the rotating electric machine system 10. Stated otherwise, the number of the leg members 210 is not limited to being six as in the illustrated example.

A cylindrically shaped cover member 212 projects out toward the rotating electric machine system 10 from a central opening of the second annular portion 208. Right ends of the leg members 210 continue to both sides of the cylindrically shaped cover member 212. An air intake space 214 is formed between the leg members 210.

As shown in FIG. 7 and FIG. 8, air bleed passages 216 are individually formed in the interior of the six leg members 210. In the leg members 210, inlet ports of the air bleed passages 216 are individually formed at connection locations thereof with the cylindrically shaped cover member 212. In the first annular portion 206, outlet ports of the air bleed passages 216 are individually formed on the end surface thereof that faces toward the second sub-housing 20. All of the outlet ports of the air bleed passages 216 are positioned on the circumference of a virtual circle. Accordingly, all of the outlet ports of the air bleed passages 216 are superimposed on the collection flow passage 162 which is formed in an annular shape. More specifically, all of the plurality of air bleed passages 216 are in communication with the collection flow passage 162. In this manner, the compressed air from the plurality of air bleed passages 216 flows in and is gathered in the collection flow passage 162.

Air vent holes 217 are formed in the leg members 210. The air vent holes 217 extend linearly from an inner wall to an outer wall of the cylindrically shaped cover member 212. The air vent holes 217 are also capable of extending from an inner wall of the cylindrically shaped cover member 212 to outer walls of the leg members 210. The number of the air vent holes 217 may be one individual air vent hole or a plurality of individual air vent holes. Further, formation of the air vent holes 217 is not strictly essential.

As shown in FIG. 8, an annular shaped engaging concave portion 218 is formed on a right end surface of the second annular portion 208. The shroud case 220 and a diffuser 226 are positioned and fixed in place by the engaging concave portion 218 (to be described later).

As shown in FIG. 8, the gas turbine engine 200 is further equipped with the shroud case 220, the compressor wheel 222, the turbine wheel 224, the diffuser 226, a combustor 228, and a nozzle 230.

The shroud case 220 is a hollow body, and is of a larger scale than the rectifying member 96. A small diameter left end of the shroud case 220 faces toward the rectifying member 96. In the inner housing 2021, a large diameter right end of the shroud case 220 is inserted into the cylindrically shaped cover member 212. The shroud case 220 gradually decreases in diameter from the right end toward the left end, however, the distal end of the left end thereof is curved so as to expand diametrically outward.

The left end of the shroud case 220 is exposed to the air intake space 214. The top portion 102 of the rectifying member 96 enters into the interior of the shroud case 220 at the left end thereof. In the shroud case 220, an annular shaped closing flange portion 232 is provided on a curved side circumferential wall. An outer edge of the closing flange portion 232 abuts against the inner walls of the cylindrically shaped cover member 212 and the leg members 210.

In the side wall of the shroud case 220, an air bleed port 234 is formed between the closing flange portion 232 and a first engaging convex portion 238. The air bleed port 234 extends from the inner surface to the outer surface of the side wall of the shroud case 220. The air bleed port 234 serves as an inlet port to a chamber 236 when the compressed air enters into the chamber 236.

The chamber 236 is interposed between the air bleed port 234 and the air bleed passages 216. More specifically, the chamber 236 allows the air bleed port 234 and the air bleed passages 216 to communicate with each other. Further, the chamber 236 is open to the atmosphere through the air vent holes 217.

From the right end of the shroud case 220, the first engaging convex portion 238 projects out toward the second annular portion 208. The first engaging convex portion 238 engages with the engaging concave portion 218 of the second annular portion 208. Due to such engagement and the outer edge of the closing flange portion 232 coming into abutment against the inner walls of the cylindrically shaped cover member 212 and the leg members 210, the shroud case 220 is positioned and fixed in place in the inner housing 2021. Simultaneously, the chamber 236 is formed, which is surrounded by the leg members 210, the cylindrically shaped cover member 212, the second annular portion 208, the closing flange portion 232 of the shroud case 220, and the side circumferential wall and the first engaging convex portion 238. The chamber 236 exhibits an annular shape which surrounds the shroud case 220.

The compressor wheel 222 and the turbine wheel 224 are capable of rotating integrally together with the rotating shaft 40 and the output shaft 204. More specifically, as shown in detail in FIG. 5, the compressor wheel 222 includes the small diameter cylindrical portion 242 at the left end thereof. The small diameter cylindrical portion 242 enters into the insertion hole 108 that is formed in the rectifying member 96. A first outer spline 239 is formed on the inner wall of the small diameter cylindrical portion 242. The first outer spline 239 is enmeshed with the first inner spline 66 formed on the right open end 442 of the outer shaft 44.

The right open end 442 of the outer shaft 44 is press-fitted into a hollow interior of the small diameter cylindrical portion 242. Therefore, the inner circumferential wall of the left opening of the small diameter cylindrical portion 242 presses the outer circumferential wall of the right open end 442 of the outer shaft 44 diametrically inward. Due to the enmeshment and press-fitting described above, the compressor wheel 222 is connected to the outer shaft 44 (the rotating shaft 40).

A through hole 240 that extends along the left/right direction is formed in a diametrical center of the compressor wheel 222. In the through hole 240, a second outer spline 246 is engraved into the inner wall of the left end thereof. Further, in the through hole 240, a hole diameter of a location contiguous with the hollow interior of the small diameter cylindrical portion 242 is slightly smaller than that of other locations. Therefore, in the compressor wheel 222, an inner flange portion 248 is provided in close proximity to an opening on the side of the small diameter cylindrical portion 242 of the through hole 240. At the portion where the inner flange portion 248 is provided, the hole diameter (diameter) of the through hole 240 is smallest.

The output shaft 204 provided on the turbine wheel 224 is inserted into the through hole 240. The distal end of the left end of the output shaft 204 extends out substantially to the same position as the distal end of the left end of the small diameter cylindrical portion 242 of the compressor wheel 222. As noted previously, the right open end 442 of the outer shaft 44 is press-fitted into the hollow interior of the small diameter cylindrical portion 242. Therefore, the left end of the output shaft 204, which is projected out from the through hole 240, enters into the connecting hole 62 of the rotating shaft 40. A male screw 252 is engraved on the left end of the output shaft 204. The male screw 252 is screw-engaged with the female screw portion 64 that is formed on the inner wall of the connecting hole 62. Due to such screw-engagement, the rotating shaft 40 and the output shaft 204 are connected.

A second inner spline 254 is formed in close proximity to the left end of the output shaft 204. The second inner spline 254 is enmeshed with the second outer spline 246 formed on the inner circumferential wall of the through hole 240. Further, a left end part of the output shaft 204 is press-fitted into the inner flange portion 248.

As shown in FIG. 8, a ring member 256 is interposed between the compressor wheel 222 and the turbine wheel 224. Stated otherwise, the ring member 256 is sandwiched between the compressor wheel 222 and the turbine wheel 224, and thereby provides a seal between both of the wheels 222 and 224. The ring member 256, for example, is made up from a heat resistant metal material such as a nickel-based alloy or the like.

Within the hollow interior of the outer housing 2022, respective portions of the shroud case 220 and the compressor wheel 222, as well as an intermediate plate 266 are surrounded by the diffuser 226. A second engaging convex portion 273 is formed on the left end of the diffuser 226. The second engaging convex portion 273 is engaged with the engaging concave portion 218 together with the first engaging convex portion 238 of the shroud case 220. Due to such engagement, the diffuser 226 is positioned and fixed in place in the inner housing 2021.

Within the hollow interior of the outer housing 2022, the turbine wheel 224 is surrounded by the nozzle 230, and the nozzle 230 is surrounded by the combustor 228. An annular shaped combustion air flow passage 274 is formed between the combustor 228 and the outer housing 2022. The combustion air flow passage 274 is a passage through which the combustion air flows. A fuel supply nozzle 275 is positioned and fixed to a right end surface of the outer housing 2022. The fuel supply nozzle 275 supplies fuel to the combustor 228.

Relay holes 276 in order to place the combustion air flow passage 274 and the interior of the combustor 228 in communication with each other are formed in the combustor 228. As will be discussed later, the combustion air that is compressed by the compressor wheel 222 reaches the interior of the combustor 228 via the diffuser 226, the combustion air flow passage 274, and the relay holes 276. Non-illustrated fine holes are also formed in the combustor 228. Air discharged from the fine holes forms an air curtain that serves to cool the interior of the combustor 228.

The nozzle 230 includes a portion that surrounds the largest diameter portion of the turbine wheel 224. A non-illustrated delivery hole is formed in this portion for the purpose of supplying fuel, which has undergone combustion together with the combustion air, to the turbine wheel 224. Moreover, it should be noted that, hereinafter, the fuel that has undergone combustion may also be referred to as a "combusted fuel". The term "combusted fuel" is synonymous with the term "combustion gas" or the "exhaust gas after combustion".

An exhaust port 280 opens at the right end of the outer housing 2022 and the nozzle 230. After passing through the delivery hole and into the nozzle 230, by the rotating turbine wheel 224, the combusted fuel is blown out to the exterior of the outer housing 2022 through the exhaust port 280. Moreover, although not shown in particular, an exhaust pipe through which the combusted fuel is discharged is provided in the exhaust port 280.

Although not shown in particular, a fire prevention member (not shown) which is separate from the fire prevention member 180 is provided in the gas turbine engine 200. More specifically, another fire prevention member is positioned in the first region AR1, and protects the rotating electric machine system 10 from heat or the like that is generated by the gas turbine engine 200.

The combined power system 400 according to the first embodiment is basically configured in the manner described above. Next, a description will be given concerning the advantageous effects of the combined power system 400.

In order to initiate operation of the combined power system 400, first, the rotating shaft 40 is rotated by a non-illustrated well known type of starter. Alternatively, electrical power may be supplied from the battery 146 and thereby cause the rotating shaft 40 to rotate.

A description will be given concerning the latter case. In this case, a DC current is supplied from the battery 146. The conversion circuit 152 of the current converter 150 shown in FIG. 2 and FIG. 6 converts such a DC current into an AC current. The AC current is supplied to the electromagnetic coil 110 (the U-phase coil, the V-phase coil, and the W-phase coil) via the U-phase terminal 1441, the V-phase terminal 1442, and the W-phase terminal 1443. By the AC current flowing through the electromagnetic coil 110, an alternating magnetic field is generated in the stator 36. Therefore, an attraction force and a repulsion force act alternately between the electromagnetic coil 110 and the permanent magnets 72 of the rotor 34. As a result, the rotating shaft 40 begins to rotate.

In this instance, as shown in FIG. 5, the first inner spline 66 is formed on the outer circumferential wall of the right open end 442 of the outer shaft 44, and the first outer spline 239 is formed on the inner wall of the small diameter cylindrical portion 242 of the compressor wheel 222. The first inner spline 66 and the first outer spline 239 enmesh with one another. Further, the second inner spline 254 is formed on the output shaft 204, and the second outer spline 246 is formed on the inner wall of the through hole 240 of the compressor wheel 222. The second inner spline 254 and the second outer spline 246 enmesh with one another. Therefore, a rotational torque of the rotating shaft 40 is rapidly transmitted to the output shaft 204 via the compressor wheel 222.

More specifically, when the rotating shaft 40 begins to rotate, the output shaft 204 also starts rotating integrally together with the rotating shaft 40. Along therewith, the compressor wheel 222 and the turbine wheel 224, which are supported by the output shaft 204, rotate integrally together with the output shaft 204. In the foregoing manner, by the first inner spline 66 and the first outer spline 239 being enmeshed, and by the second inner spline 254 and the second outer spline 246 being enmeshed, the rotational torque of the rotating shaft 40 can be sufficiently transmitted to the output shaft 204.

In addition, the right end part of the rotating shaft 40 is press-fitted into the hollow interior of the small diameter cylindrical portion 242 of the compressor wheel 222. Further, the left end part of the output shaft 204 is press-fitted into the inner flange portion 248 of the compressor wheel 222. Therefore, the axis of the rotating shaft 40 and the axis of the output shaft 204 coincide precisely. In accordance with this feature, the output shaft 204 is sufficiently prevented from rotating in an eccentric manner or while being subjected to vibrations.

Furthermore, a frictional force is generated between the right end surface of the compressor wheel 222 and the left end surface of the ring member 256. A frictional force is also generated between the right end surface of the ring member 256 and the left end surface of the turbine wheel 224. Due to such frictional forces, the compressor wheel 222, the ring member 256, and the turbine wheel 224 are kept in close contact with each other. Accordingly, a situation is avoided in which both of the wheels 222 and 224 give rise to rotational misalignment.

Due to the above-described rotation, as shown in FIG. 8, atmospheric air is drawn into the shroud case 220 through the air intake space 214 formed between the leg members 210 of the inner housing 2021. In this instance, the rectifying member 96 is positioned at the diametrical center of the inner housing 2021. As noted previously, the rectifying member 96 exhibits a chevron shape that becomes smaller in diameter following along the shroud case 220. In addition, the surface of the reduced diameter portion 100 is smooth. Therefore, the atmospheric air that is drawn in is rectified by the rectifying member 96 in a manner so as to flow toward the shroud case 220. Since the right end of the rectifying member 96 enters from the left end opening of the shroud case 220, the atmospheric air is efficiently introduced into the shroud case 220. In this manner, by the rectifying member 96 being shaped in the manner described above, and by the top portion 102 being made to enter into the shroud case 220, the atmospheric air can be efficiently collected by the shroud case 220.

The atmospheric air that is drawn into the shroud case 220 flows between the compressor wheel 222 and the shroud case 220. Since, in comparison with the left opening of the shroud case 220, the space between the compressor wheel 222 and the shroud case 220 is sufficiently narrow, along with flowing therethrough in this manner, the atmospheric air is compressed. Stated otherwise, the compressed air is generated.

The air bleed port 234 is formed in the shroud case 220. Therefore, a portion of the compressed air flows in a branching manner from the air bleed port 234 as curtain air, and flows into the chamber 236. The chamber 236 is formed in an annular shape, and includes a larger volume in comparison with the volume of the air bleed port 234. Therefore, the curtain air that flows into the chamber 236 is temporarily accumulated and retained in the chamber 236.

Since the plurality of bleed passages 216 are formed, the compressed air is distributed from the chamber 236 to each of the air bleed passages 216. In this case, the curtain air itself that is distributed may differ in pressure. However, according to the first embodiment, the compressed air (the curtain air) that has passed through the air bleed port 234 flows into the single individual chamber 236 that is formed in an annular shape. Consequently, the pressure of the curtain air inside the chamber 236 is uniform. Stated otherwise, the pressure of the curtain air is equalized. In this manner, the chamber 236 serves as a pressure regulation chamber that regulates the pressure of the curtain air to be substantially constant.

The curtain air that has flowed in from the air bleed port 234, as has been discussed previously, makes up a portion of the compressed air, and is high in pressure. In this instance, since the volume of the chamber 236 is larger than the volume of the air bleed port 234, the curtain air spreads out as it flows into the chamber 236. Therefore, the pressure of the curtain air is lowered. As can be understood from this feature, the chamber 236 also serves in a dual manner as a buffer chamber that causes the pressure of the compressed air to be reduced.

In addition to the air bleed passages 216, the air vent holes 217 are formed in the inner housing 2021. Excess compressed air is released to the exterior (the atmosphere) of the gas turbine engine 200 through the air vent holes 217. Therefore, an excessive increase in the pressure of the curtain air inside the chamber 236 is avoided. More specifically, due to the air vent holes 217, the pressure inside the chamber 236 can be easily adjusted.

Inside the chamber 236, inlet ports of the air bleed passages 216 which are formed individually open into each of the six individual leg members 210. Therefore, next, the curtain air inside the chamber 236 flows individually through the six bleed passages 216, and in accordance therewith, travels toward the second sub-housing 20. As noted previously, at this point in time, the pressure of the curtain air is substantially constant.

As shown in FIG. 7, the outlet ports of all of the six individual air bleed passages 216 overlap with the collection flow passage 162. Accordingly, the curtain air that has flowed through the six individual air bleed passages 216 flows in and is collected in the collection flow passage 162, and then spreads out in an annular shape along the collection flow passage 162. In this process, the pressure of the curtain air is made more uniform.

Furthermore, the curtain air flows individually from the collection flow passage 162 into the three individual upstream communication holes 164, and separately flows along the three individual air relay paths 166. Thereafter, a portion of the curtain air is discharged from the first downstream communication holes 1681 to 1683. Further, a remaining portion of the curtain air is discharged from the second downstream communication holes 1701 to 1703. Hereinafter, the curtain air that is discharged from the first downstream communication holes 1681 to 1683 will be referred to as a "first branched air flow". The curtain air that is discharged from the second downstream communication holes 1701 to 1703 will be referred to as a "second branched air flow".

A description will now be given concerning the route of the first branched air flow. The first downstream communication hole 1681 communicates with the hollow interior of the first hollow tube portion 1601. The first downstream communication hole 1682 communicates with the hollow interior of the second hollow tube portion 1602. The first downstream communication hole 1683 communicates with the hollow interior of the third hollow tube portion 1603. Accordingly, the first branched air flow flows through the first hollow tube portion 1601 through the third hollow tube portion 1603 shown in FIG. 2, etc., and flows from the second end to the first end of the rotating electric machine housing 14.

The first hollow tube portion 1601 through the third hollow tube portion 1603 are positioned on an outer circumferential portion of the cooling jacket 24. The cooling medium is allowed to flow in advance through the cooling jacket 24. Accordingly, the heat of the first branched air flow is sufficiently conducted to the cooling medium as the first branched air flow flows along the first hollow tube portion 1601 through the third hollow tube portion 1603. Consequently, the first branched air flow becomes a relatively low temperature. More specifically, according to the first embodiment, in accordance with the cooling jacket 24 in order to cool the rotating electric machine 12, the current converter 150, and the like, the temperature of the first branched air flow can also be lowered. Therefore, there is no need to separately provide cooling equipment in order to cool the curtain air in the gas turbine engine 200 or the rotating electric machine system 10. Accordingly, it is possible to reduce the size and scale of the combined power system 400.

In the first end of the main housing 16, the first branched air flow, which has flowed through the first hollow tube portion 1601 through the third hollow tube portion 1603, flows into the accommodation chamber 22 which makes up a portion of the first flow passage. A portion of the first branched air flow flows into the internal space (the second flow passage) of the first casing 26 via the communication passage 196. Consequently, the air curtain is formed inside the first casing 26. In the case that the mutual communication holes are formed between the first casing 26 and the second casing 28, the first branched air flow that has passed through the first casing 26 flows into the interior of the second casing 28 via the mutual communication holes. Consequently, the air curtain is formed inside the second casing 28.

As shown in FIG. 3, the remaining portion of the first branched air flow flows through the accommodation chamber 22 that is formed in the main housing 16. As can be understood from this feature, the accommodation chamber 22 (the first flow passage) of the main housing 16 is located upstream in the flow path of the first branched air flow. The internal space of the first casing 26 (and the internal space of the second casing 28) are located downstream in the flow path of the first branched air flow.

A major portion of the first branched air flow that has flowed in from the left end of the accommodation chamber 22 enters into the clearance between the outer circumferential wall of the columnar shaped projecting portion 76 and the insulating substrates 112. Such a clearance serves as the inner hole of the stator 36.

The first branched air flow that has flowed into the inner hole of the stator 36 branches into a first branching flow that flows through the first branching passage L, and a second branching flow that flows through the second branching passage M. The first branching flow flows through the first branching passage L toward the first insertion hole 78. The second branching flow flows through the second branching passage M, passes along the clearance between the outer walls of the permanent magnets 72 and the inner wall of the electromagnetic coil 110, and flows toward the second insertion hole 86. In this manner, the first branched air flow is divided into a first branching flow that flows toward the first insertion hole 78 at the left end (the first end), and a second branching flow that flows toward the second insertion hole 86 at the right end (the second end).

The first branching flow that has flowed toward the first insertion hole 78 reaches the first proximal end 782 of the first insertion hole 78. In the first proximal end 782, the first branching flow becomes an air curtain for the first bearing 74. On the other hand, the second branching flow that has flowed toward the second insertion hole 86 passes through the first sub-branching passage 941 and reaches the second distal end 861 of the second insertion hole 86. In the second distal end 861, the second branching flow becomes an air curtain for the second bearing 84.

A description will now be given concerning the route of the second branched air flow. The second downstream communication holes 1701 to 1703 individually overlap with the three individual inlet ports 104 that are formed in the base portion 98 of the rectifying member 96. Accordingly, the second branched air flow flows into the relay chamber 106 (the hollow interior of the rectifying member 96) through the inlet ports 104.

As noted previously, the outlet of the relay chamber 106 opens at a position that faces toward the small diameter cylindrical portion 242 of the compressor wheel 222. Accordingly, the second branched air flow that has flowed into the relay chamber 106 comes into contact with the small diameter cylindrical portion 242. Thereafter, a portion of the second branched air flow flows toward the second sub-branching passage 942. The remaining portion of the second branched air flow flows toward the outlet passage 943.

The portion of the second branched air flow reaches the second proximal end 862 of the second insertion hole 86 via the second sub-branching passage 942. In the second proximal end 862, the second branched air flow becomes an air curtain for the second bearing 84. In this manner, the second bearing 84 is sandwiched between the remaining portion of the second branched air flow that has reached the second proximal end 862, and the second branching flow (a portion of the first branched air flow) that has reached the second distal end 861.

The remaining portion of the second branched air flow passes through the outlet passage 943 and is discharged into the interior of the left end of the shroud case 220. At the left end opening of the shroud case 220, the air is drawn in as noted previously. Accordingly, the remaining portion of the second branched air flow is compressed by the compressor wheel 222 along with the drawn in atmospheric air.

In the manner described above, the air curtains are formed in the second branching passage M, the first sub-branching passage 941, and the second sub-branching passage 942. Due to these air curtains, the lubricating oil is obstructed from entering into the internal spaces of the first casing 26 and the second casing 28. More specifically, the curtain air (the first branching air flow and the second branching air flow) prevents the lubricating oil from scattering from the first bearing 74 and the second bearing 84. Accordingly, a situation is suppressed in which the lubricating oil adheres to the permanent magnets 72, the electromagnetic coil 110, and the like. Stated otherwise, it is possible to avoid a situation in which the members and the like accommodated inside the main housing 16 become contaminated by the lubricating oil.

A surplus amount of the first branched air flow passes through the accommodation chamber 22 and reaches the exhaust path 172. A surplus amount of the second branched air flow flows from the second end to the first end of the main housing 16, for example, via the clearance between the inner wall of the accommodation chamber 22 and the electromagnetic coil 110. Thereafter, the surplus amount of the second branched air flow reaches the exhaust path 172. The first branched air flow and the second branched air flow that have arrived at the exhaust path 172 are recovered by a non-illustrated recovery device.

As noted previously, due to the chamber 236 provided between the inner housing 2021 and the shroud case 220, the pressure of the curtain air is equalized. Accordingly, the occurrence of a pressure distribution in the curtain air is avoided. Further, the occurrence of surging in the curtain air is also avoided. Therefore, while the pressure of the curtain air is maintained substantially constant, it is possible to supply the curtain air circumferentially around the first bearing 74 and the second bearing 84.

As noted previously, the relay chamber 106 becomes wider as it comes closer in proximity to the second sub-branching passage 942. In addition, the second branched air flow that has flowed out from the relay chamber 106 is divided into a portion that is directed toward the second sub-branching passage 942, and a remaining portion that is directed toward the outlet passage 943. Accordingly, the pressure of the second branched air flow that has reached the second proximal end 862 is less than the pressure of the second branched air flow prior to entering into the relay chamber 106. As a result, the pressure of the first branched air flow that has reached the second distal end 861, and the pressure of the second branched air flow that has reached the second proximal end 862 are in balance.

The compressed air that has passed between the shroud case 220 and the compressor wheel 222 without entering into the air bleed port 234 becomes the combustion air. As shown in FIG. 8, the combustion air enters into the diffuser 226. The combustion air flows out from an outlet hole that is formed in a wall portion of the diffuser 226, and into the combustion air flow passage 274 formed between the combustor 228 and the outer housing 2022. Furthermore, the combustion air flows into the combustion chamber (the hollow interior of the combustor 228) through the relay holes 276 that are formed in the combustor 228, the fine holes, and the clearance formed between the combustor 228 and the fuel supply nozzle 275.

The combustor 228 is placed in a state of being heated beforehand. Accordingly, the combustion chamber is also at a high temperature. Fuel is supplied from the fuel supply nozzle 275 to the high temperature combustion chamber. The fuel undergoes combustion together with the combustion air, and results in a high temperature combusted fuel. At a time when the combusted fuel is supplied into the nozzle 230 from the delivery hole, the combusted fuel expands inside the nozzle 230. Consequently, the turbine wheel 224 begins to rotate at a high speed.

The output shaft 204 retains the turbine wheel 224. Further, the compressor wheel 222 is also provided on the output shaft 204. Accordingly, accompanying the turbine wheel 224 being rotated at a high speed, the output shaft 204 and the compressor wheel 222 rotate together at a high speed. Simultaneously, the rotating shaft 40 also rotates at a high speed. Moreover, the combusted fuel is discharged to the exterior of the outer housing 2022 through a non-illustrated exhaust pipe provided in the exhaust port 280.

When the output shaft 204 begins to rotate at a high speed, the supply of the electrical current from the battery 146 (refer to FIG. 6) to the electromagnetic coil 110 is halted. However, since the turbine wheel 224 is already rotating at a high speed in the manner described above, the rotating shaft 40 rotates at a high speed integrally together with the turbine wheel 224 and the output shaft 204. At this time as well, for the same reasons as mentioned above, a sufficient rotational torque is transmitted from the output shaft 204 with respect to the rotating shaft 40.

As shown in FIG. 3, the direction of rotation of the output shaft 204 and the rotating shaft 40 is preferably opposite to the direction of rotation when the small cap nut 58, the large cap nut 60, and the male screw 252 are screwed together. This is because, in this case, loosening of the small cap nut 58, the large cap nut 60, and the male screw 252 during rotation of the rotating shaft 40 is avoided. Moreover, it should be noted that the small cap nut 58, the large cap nut 60, or the male screw 252 may also be provided with a mechanism in order to prevent loosening thereof.

Since the rotating shaft 40 retains the permanent magnets 72, the AC current is generated in the electromagnetic coil 110 that surrounds the permanent magnets 72. Via the U-phase terminal 1441, the V-phase terminal 1442, and the W-phase terminal 1443, the AC current is delivered to the current converter 150 shown in FIG. 2 and FIG. 6. The conversion circuit 152 of the current converter 150 converts such an AC current into a DC current. At a time when the control circuit 156 of the current converter 150 has determined that the output of an external load (for example, the motors 512) which is electrically connected to the battery 146 has decreased, the DC current is supplied to the battery 146 (refer to FIG. 6) via the capacitor 154. Consequently, charging is carried out on the battery 146.

Accompanying the electrical current flowing therethrough, the electromagnetic coil 110 generates heat. In this instance, a portion of the first branched air flow comes into contact with the left end of the stator 36. Further, a remaining portion of the first branched air flow that flows past the accommodation chamber 22 and toward the second insertion hole 86 comes into contact with the outer wall and the inner wall of the stator 36. Therefore, the stator 36 is cooled by the first branched air flow. Further, the cooling medium flows through the cooling jacket 24 that is provided in the main housing 16. The rotating electric machine 12 is rapidly cooled by the cooling medium.

In this instance, at a time when the first casing 26 and the second casing 28 are provided in the main housing 16, when the cooling jacket 24 is formed directly underneath the first casing 26 and the second casing 28, a concern arises in that the main housing 16 may not have sufficient rigidity. However, according to the first embodiment, the first casing 26 and the second casing 28 are provided in the first sub-housing 18, and are not provided in the main housing 16. Therefore, the cooling jacket 24 can be made to extend from the first end to the second end of the main housing 16 (refer to FIG. 6). In accordance with this feature, the cooling efficiency with respect to the rotating electric machine 12 is enhanced.

According to the first embodiment, the rotating electric machine housing 14 (the main housing 16) in which the rotating electric machine 12 is accommodated, and the first casing 26 in which the U-phase terminal 1441, the V-phase terminal 1442, and the W-phase terminal 1443 are accommodated are separately provided. Therefore, the influence of heat generated in the stator 36 inside the main housing 16 is less likely to affect the U-phase terminal 1441, the V-phase terminal 1442, and the W-phase terminal 1443 inside the first casing 26. Further, the first casing 26 is significantly separated away from the gas turbine engine 200. Therefore, the influence of heat generated in the gas turbine engine 200 is also less likely to affect the U-phase terminal 1441, the V-phase terminal 1442, and the W-phase terminal 1443 inside the first casing 26.

Along with the electrical current being supplied thereto, the U-phase terminal 1441, the V-phase terminal 1442, and the W-phase terminal 1443 generate heat. However, the U-phase terminal 1441, the V-phase terminal 1442, and the W-phase terminal 1443 are cooled rapidly by the portion of the first branched air flow that is supplied to the first casing 26.

In this manner, the first branched air flow also serves to cool the heat generating locations in the rotating electric machine system 10. Since the electric terminal portions (the U-phase terminal 1441, the V-phase terminal 1442, and the W-phase terminal 1443), the electromagnetic coil 110, the permanent magnets 72, and the like are cooled, a situation may be avoided in which the output control and the like of the rotating electric machine system 10 are affected by heat. Further, it is possible to prevent the magnetization of the electromagnetic coil 110, the permanent magnets 72, and the like from deteriorating due to heat. As a result, the reliability of the rotating electric machine system 10 is improved.

As described above, the rotating electric machine system 10 and the gas turbine engine 200 are cooled by the compressed air. However, due to some cause, a possibility may be considered in which the cooling of the rotating electric machine system 10 and the gas turbine engine 200 becomes insufficient. As a result, for example, it is assumed that sparking occurs in the rotating electric machine 12. Alternatively, it is assumed that an abnormal combustion occurs in the gas turbine engine 200.

According to the first embodiment, the rotating electric machine system 10 comprises the fire prevention member 180 (refer in particular to FIGS. 2 to 4) which is made up from a fire resistant material. Therefore, even in the case that sparking or an abnormal combustion occurs in the first region AR1, fire or heat and the like are shielded by the fire prevention member 180. Consequently, the second region AR2 and the passenger compartment 504 are protected from sparking or heat and the like.

The first insertion hole 182 and the second insertion hole 184 are formed in the fire prevention member 180. A first end of the first casing 26 is exposed through the first insertion hole 182, and the first end of the transmission connector 136 is exposed through the second insertion hole 184. Accordingly, there is no need to provide relay connectors in the fire prevention member 180 for relaying the electrical connections between the U-phase terminal 1441, the V-phase terminal 1442, and the W-phase terminal 1443 and the external device. Similarly, there is no need to provide a relay connector in order to electrically connect the transmission connector 136 and the reception connector. There is also no need to provide a relay connector in order to electrically connect the harness 149 of the thermistor 148 and the control device 510 (refer to FIG. 1). Consequently, an increase in the number of component parts is avoided.

Further, a gap between the inner wall of the first insertion hole 182 and the first end of the first casing 26 is so small that it can be ignored. Similarly, a gap between the inner wall of the second insertion hole 184 and the transmission connector 136 is so small that it can be ignored. In this manner, the first insertion hole 182 and the second insertion hole 184 are closed respectively by the first casing 26 and the transmission connector 136. Accordingly, sparking or the like that is generated in the first region AR1 is prevented from passing through the first insertion hole 182 or the second insertion hole 184 and reaching the second region AR2. More specifically, due to the first insertion hole 182 and the second insertion hole 184 being formed, a decrease in the flame shielding ability and the heat shielding ability of the fire prevention member 180 is avoided.

In the first embodiment, the fire prevention member 180 is provided in the form of a wall. More specifically, the fire prevention member 180 does not form a large enclosure that covers the entirety of the combined power system 400. Therefore, the size and weight of the fire prevention member 180 can be reduced. Further, the engine compartment 508 (refer to FIG. 1) in which the combined power system 400 is installed is not required to be large. In addition, it is unnecessary to provide equipment in order to supply carbon dioxide into the interior of the enclosure. For the above reasons, it is possible to make the flying object 500 both smaller in scale and lighter in weight.

Figure 9:
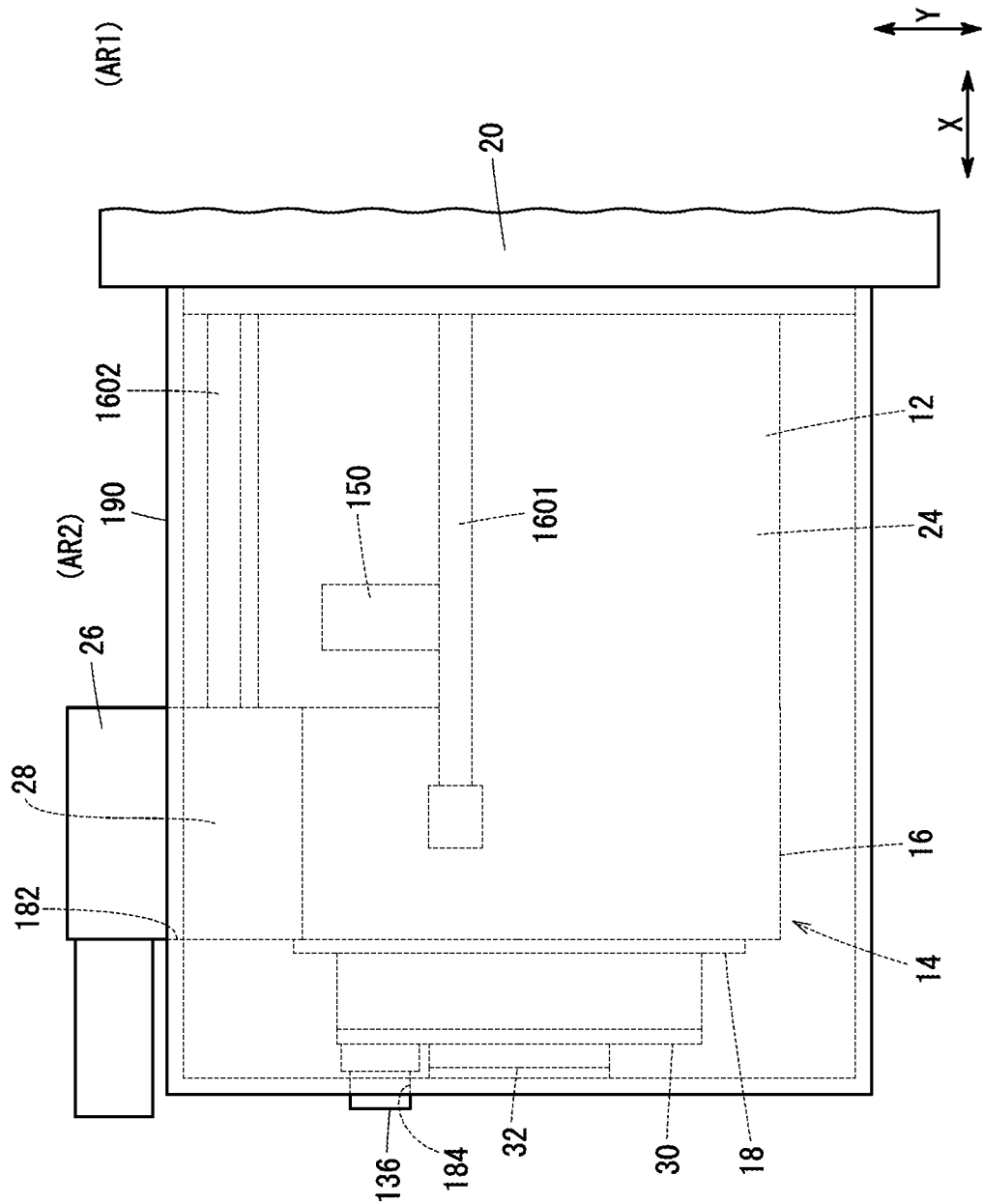
FIG. 9 is a schematic side view of a rotating electric machine system including a fire prevention member having a different shape from that shown in FIG. 2.

Moreover, instead of the fire prevention member 180, a fire prevention member 190 as shown in FIG. 9 may be provided. In this case, the fire prevention member 190 is a hollow cylindrical body in which the rotating electric machine housing 14 can be accommodated in the interior thereof. A dimension in the lengthwise direction of the fire prevention member 190 is substantially the same as a sum of the respective dimensions in the lengthwise direction of the first sub-housing 18 and the main housing 16. Accordingly, the fire prevention member 190 covers the outer circumference of the first sub-housing 18 and the main housing 16.

A second end of the fire prevention member 190 is an open end. The diameter of the fire prevention member 190 is smaller than the diameter of the second sub-housing 20. Accordingly, in the second sub-housing 20, the second end of the fire prevention member 190 is placed in abutment against the outer surface thereof that faces toward the main housing 16.

The first insertion hole 182 and the second insertion hole 184 are formed in the fire prevention member 190. The first insertion hole 182 and the second insertion hole 184 penetrate from the inner peripheral wall toward the outer peripheral wall of the fire prevention member 190. In this case as well, the first insertion hole 182 and the second insertion hole 184 are closed respectively by the first casing 26 and the transmission connector 136.

The angle of rotation (the rotational parameter) of the rotating shaft 40 is detected by the resolver 132 while the rotating shaft 40 is undergoing rotation. Specifically, the resolver rotor 56 that is attached to the left end part 422 of the inner shaft 42 rotates together integrally with the rotating shaft 40. Consequently, an electrical signal generated in the resolver stator 130 is transmitted to the receiver via the transmission connector 136. The receiver that has received and read the electrical signal calculates the angle of rotation of the rotating shaft 40 on the basis of the electrical signal. The receiver delivers the calculation result to the control device 510. The control device 510 obtains the RPM by way of a calculation based on the angle of rotation.

According to the first embodiment, the resolver 132 is arranged at the projecting distal end 46 that is exposed from the rotating electric machine housing 14. Accordingly, it is less likely for the resolver 132 to be influenced by heat generated in the electromagnetic coil 110 inside the rotating electric machine housing 14. Therefore, the resolver 132 is capable of accurately calculating the angle of rotation of the rotating shaft 40. Stated otherwise, the detection result of the angle of rotation calculated by the resolver 132 becomes accurate. Further, the useful lifetime of the resolver 132 is lengthened.

For the reasons described above, even in the case that the diameter of the rotating shaft 40 is small, the rotational parameter of the rotating shaft 40 can be accurately calculated. Accordingly, it is possible to reduce the size and scale of the rotating electric machine system 10 and the combined power system 400.

Maintenance can be carried out with respect to the rotating electric machine system 10. According to the first embodiment, the electrical systems such as the U-phase terminal 1441, the V-phase terminal 1442, the W-phase terminal 1443, and the transmission connector 136 of the resolver 132 are exposed from the fire prevention member 180 and concentrated within the second region AR2. Accordingly, maintenance of the electrical systems from the second region AR2 is easily carried out.

Further, at a time when maintenance of the electrical systems is carried out, it is not particularly necessary to disconnect the rotating electric machine system 10 from the gas turbine engine 200. Therefore, the work efficiency in performing such maintenance is improved.

Figure 10:
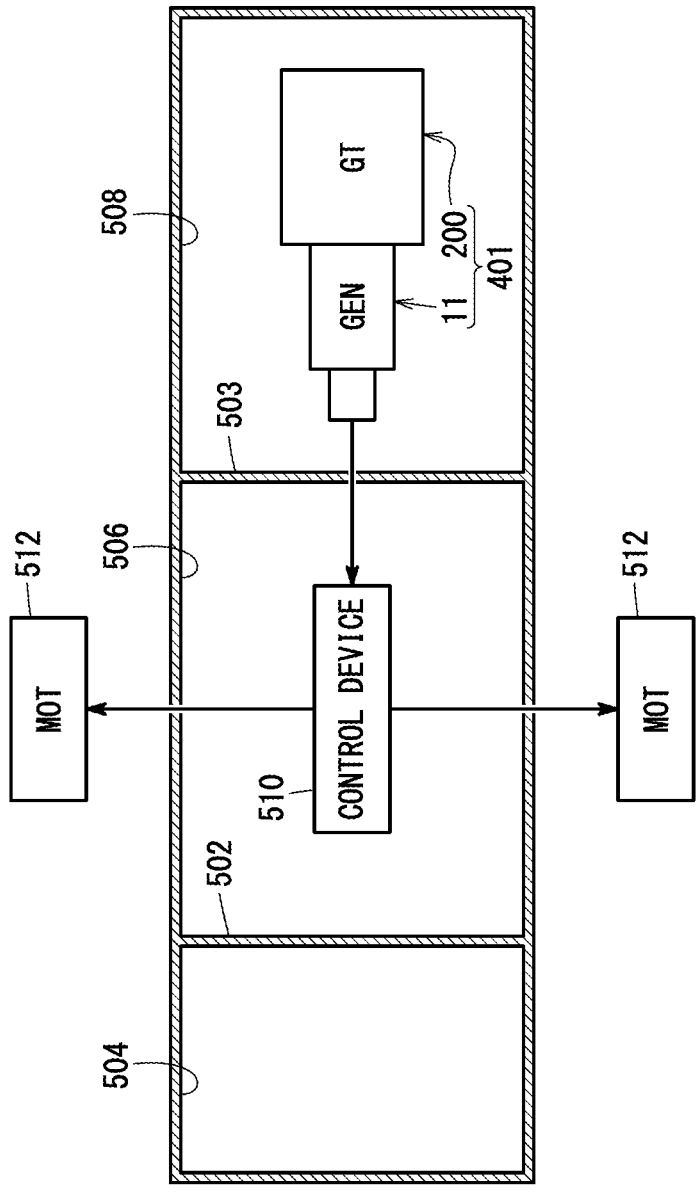
FIG. 10 is a schematic diagram of a flying object equipped with a combined power system.

Instead of the above-described combined power system 400, as shown in FIG. 10, a combined power system 401 according to a second embodiment may be installed in the flying object 500 (refer to FIG. 10). Next, a description will be given concerning the combined power system 401 according to the second embodiment.

Figure 11:
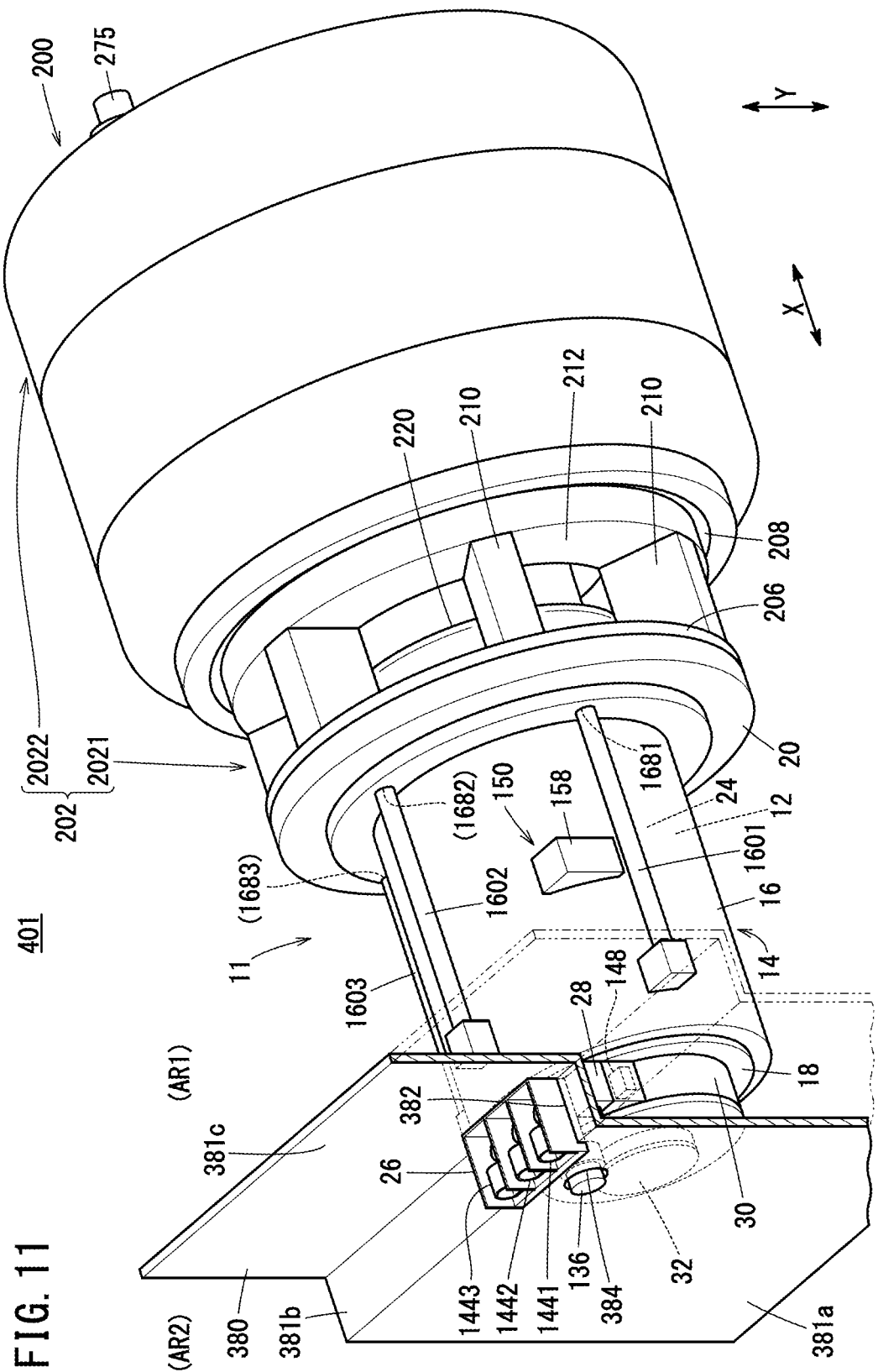
FIG. 11 is a schematic overall perspective view of a combined power system according to a second embodiment of the present invention.

As shown in FIG. 11, the combined power system 401 is equipped with a rotating electric machine system 11, and the gas turbine engine 200. In this instance, the configuration of the gas turbine engine 200 is the same as the configuration of the gas turbine engine 200 that constitutes part of the combined power system 400. Therefore, a detailed description of the gas turbine engine 200 will be omitted. Further, concerning the constituent elements of the gas turbine engine 200 shown in the drawings, such elements will be designated by the same reference numerals as those in the first embodiment. Concerning the rotating electric machine system 11 as well, constituent elements that are the same as those in the rotating electric machine system 10 are basically designated by the same reference numerals. Further, in the second embodiment, the drawings referred to in the first embodiment may be used.

Figure 12:
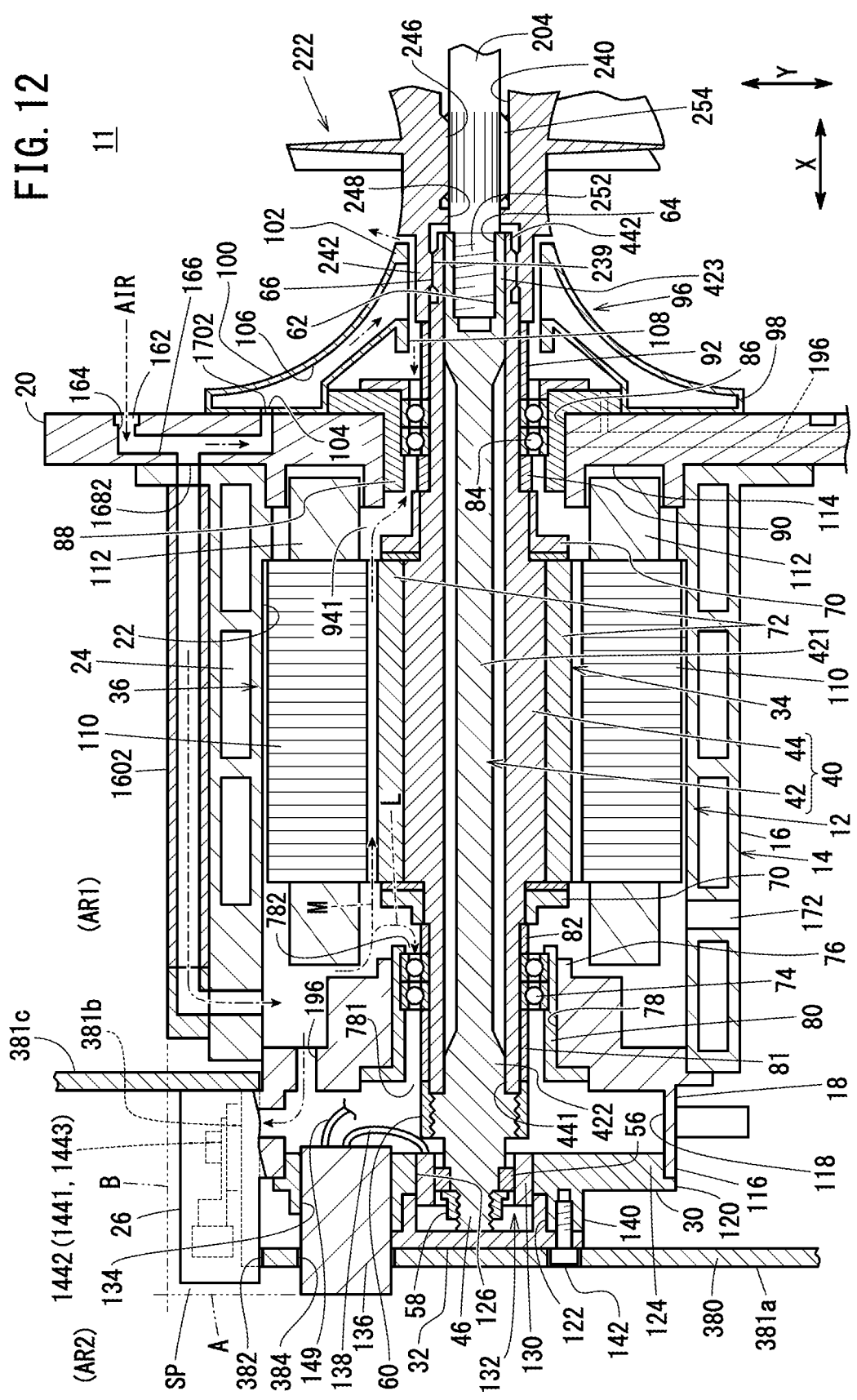
FIG. 12 is a schematic side cross-sectional view of a rotating electric machine system according to the second embodiment of the present invention.

FIG. 12 is a schematic side cross-sectional view of the rotating electric machine system 11. In this instance, the arrow X in FIG. 12 indicates the axial direction (a first direction) of the rotating electric machine system 11. More specifically, FIG. 12 shows a side surface in the rotating electric machine system 11 taken along the first direction.

The rotating electric machine system 11 is equipped with the rotating electric machine 12, and the rotating electric machine housing 14 in which the rotating electric machine 12 is accommodated. The rotating electric machine 12, for example, is a generator.

The rotating electric machine housing 14 includes the main housing 16, a first sub-housing 318, and the second sub-housing 20. The main housing 16 exhibits a generally cylindrical shape, and both a first end and a second end thereof are open ends. The first sub-housing 318 is connected to the first end (the left open end) of the main housing 16. The second sub-housing 20 is connected to the second end (the right open end) of the main housing 16. In the manner described above, the first end and the second end of the main housing 16 are closed.

The main housing 16 has a thick side wall that extends in a left/right direction. The accommodation chamber 22 is formed in the interior of the side wall. The majority of the components of the rotating electric machine 12 are accommodated in the accommodation chamber 22.

The spiral cooling jacket 24 is formed in the interior of the side wall of the main housing 16. A cooling medium flows through the cooling jacket 24. As a specific example of the cooling medium, there may be cited cooling water. In this case, the cooling jacket 24 is a water jacket.

The first casing 26 and the second casing 28 are provided at a first end (a left end) of the first sub-housing 318. The first casing 26 and the second casing 28 serve as one portion of the first sub-housing 318. More specifically, the first casing 26 and the second casing 28 are disposed integrally with the first sub-housing 318. In accordance with this feature, the first casing 26 and the second casing 28 are supported by the rotating electric machine housing 14. As will be discussed later, the first casing 26 is a terminal casing. The second casing 28 is a measuring instrument casing. The material of the first casing 26, the second casing 28, and the first sub-housing 318 is preferably a refractory material (a material having a resistance to heat).

The resolver holder 30 (retaining member), which retains the resolver 132 that serves as the rotational parameter detector, is connected to the first sub-housing 318. The cap cover 32 is connected via screws to the resolver holder 30.

The rotating electric machine 12 includes the rotor 34, and the stator 36 that surrounds the outer circumference of the rotor 34.

The rotor 34 includes the rotating shaft 40. The rotating shaft 40 includes the inner shaft 42, and the hollow cylindrical shaped outer shaft 44. Both ends of the outer shaft 44 are open ends. More specifically, the outer shaft 44 has the left open end 441 (refer to FIG. 13) and the right open end 442 (refer to FIG. 5). The inner shaft 42 is removably inserted in the interior of the outer shaft 44.

The inner shaft 42 is longer in comparison with the outer shaft 44. The inner shaft 42 includes the cylindrical columnar part 421, the left end part 422 (refer to FIG. 13), and the right end part 423 (refer to FIG. 5). The left end part 422 extends to the left of the cylindrical columnar part 421. Accordingly, the left end part 422 is an end (a first end) of the inner shaft 42 that is separated away from the gas turbine engine 200. The right end part 423 extends to the right of the cylindrical columnar part 421. Accordingly, the right end part 423 is an end (a second end) of the inner shaft 42 that is in close proximity to the gas turbine engine 200. The diameter of the cylindrical columnar part 421 is smaller than the diameter of the left end part 422 and the right end part 423. Further, the diameter of the right end part 423 is smaller than the diameter of the left end part 422.

One portion of the left end part 422 is exposed from the left open end 441 of the outer shaft 44. The portion exposed from the left open end 441 constitutes the projecting distal end 46, which will be described later. Moreover, in the illustrated example, the right end part 423 of the inner shaft 42 and the right open end 442 of the outer shaft 44 are flush with each other. However, the right end part 423 may be positioned slightly closer to the second end from the right open end 442.

Figure 13:
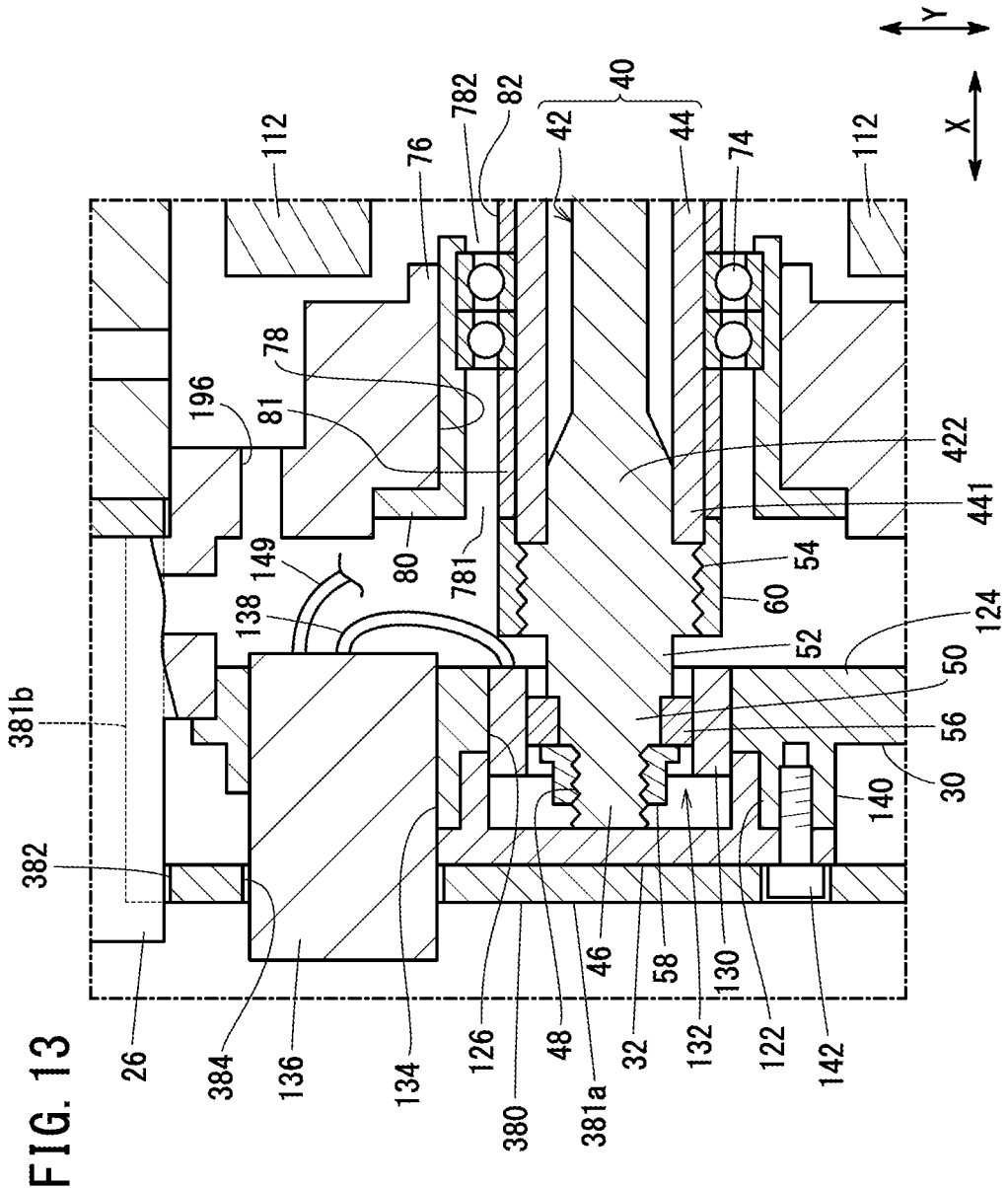
FIG. 13 is an enlarged view of principal components shown in FIG. 12.

As shown in detail in FIG. 13, the first externally threaded portion 48, the flange portion 50, the stopper portion 52, and the second externally threaded portion 54 are provided sequentially in this order toward the right on the left end part 422 of the inner shaft 42. The outer diameters of the first externally threaded portion 48, the flange portion 50, the stopper portion 52, and the second externally threaded portion 54 become larger in this order. The outer diameter of the second externally threaded portion 54 is larger in comparison with the inner diameter of the outer shaft 44. Therefore, the right end of the second externally threaded portion 54 is stopped by the edge of the left open end 441 of the outer shaft 44. Accordingly, in the inner shaft 42, a portion thereof more in the leftward direction than the second externally threaded portion 54 is not inserted into the outer shaft 44.

The resolver rotor 56 is attached to the flange portion 50. Further, the small cap nut 58 is screw-engaged with the first externally threaded portion 48. A right end of the resolver rotor 56 is stopped by the stopper portion 52. A left end of the resolver rotor 56 is pressed by the small cap nut 58. Due to the above-described features, the resolver rotor 56 is positioned and fixed to the flange portion 50.

Further, the large cap nut 60 is screwed-engaged with the second externally threaded portion 54. A right end of the large cap nut 60 covers an outer circumferential wall of the left open end 441 of the outer shaft 44. In accordance with this feature, the left end part 422 of the inner shaft 42 is restrained by the left open end 441 of the outer shaft 44. Moreover, the first externally threaded portion 48 and the second externally threaded portion 54 are so-called reverse threads. Accordingly, when screw-engaged, the small cap nut 58 and the large cap nut 60 are rotated counterclockwise. After being screw-engaged, it is preferable to partially deform the screw threads of the small cap nut 58 and the large cap nut 60. In accordance with this feature, the small cap nut 58 and the large cap nut 60 are prevented from becoming loosened.

As shown in FIG. 5, the connecting hole 62 is formed in the right end part 423 which is the second end of the inner shaft 42. The connecting hole 62 extends toward the left end part 422 which is the first end. The female screw portion 64 is engraved on an inner circumferential wall of the connecting hole 62. The left end of the output shaft 204 is inserted into the connecting hole 62. The left end of the output shaft 204 is coupled to the inner shaft 42 by being screw-engaged with the female screw portion 64. The compressor wheel 222 and the turbine wheel 224 (refer to FIG. 8) are retained on the output shaft 204.

Further, the first inner spline 66 is formed on the outer circumferential wall of the right open end 442 of the outer shaft 44. The first inner spline 66 extends along the axial direction (left/right direction) of the rotating electric machine system 11.

As shown in FIG. 12, the outer diameter of the outer shaft 44 is maximum at a substantially central portion in the longitudinal direction. The plurality of permanent magnets 72 are retained via magnet holders 70 on the large diameter central portion. In the permanent magnets 72 that are adjacent to each other, polarities thereof which are different from each other face outward. As the rotating shaft 40 undergoes rotation, the permanent magnets 72 move along a circumference of a predetermined virtual circle about the center of rotation of the rotating shaft 40.

A left end (first end part) of the rotating shaft 40 is rotatably supported in the first sub-housing 318 via the first bearing 74. As shown in FIG. 12, the first bearing 74 is inserted between the outer shaft 44 and the first sub-housing 318. Specifically, the first sub-housing 318 includes the columnar shaped projecting portion 76 that is projected out toward the main housing 16. The first insertion hole 78 is formed in the columnar shaped projecting portion 76. The first bearing holder 80 by which the first bearing 74 is retained is inserted into the first insertion hole 78. Accordingly, the first bearing 74 is arranged in the first insertion hole 78.

The first insertion hole 78 extends along the left/right direction. The first distal end 781 of the first insertion hole 78 is separated farther away from the output shaft 204 than the first proximal end 782 of the first insertion hole 78. Stated otherwise, the first proximal end 782 of the first insertion hole 78 is in closer proximity to the output shaft 204 than the first distal end 781 of the first insertion hole 78.

The first outer stopper 81 positioned at the first distal end 781, and the first inner stopper 82 positioned at the first proximal end 782 are installed on a small diameter left end of the outer shaft 44. The first bearing 74 is sandwiched between the first outer stopper 81 and the first inner stopper 82. Based on being sandwiched in this manner, the first bearing 74 is positioned and fixed in place. A clearance is formed between the first outer stopper 81 and the columnar shaped projecting portion 76.

The distal end (the projecting distal end 46) of the left end part of the rotating shaft 40 passes through the first insertion hole 78 after having passed through the inner hole of the first bearing 74. The projecting distal end 46 is further exposed on an outer side (the hollow concave portion 118) of the columnar shaped projecting portion 76. Within the left end part 422 of the inner shaft 42, the first externally threaded portion 48, the flange portion 50, the stopper portion 52, and the second externally threaded portion 54 are included on the projecting distal end 46 (refer to FIG. 13).

A right end part (second end part) of the rotating shaft 40 is rotatably supported in the second sub-housing 20 via the second bearing 84. As shown in FIG. 5, the second bearing 84 is inserted between the outer shaft 44 and the second sub-housing 20 which exhibits a substantially disk shape.

The second sub-housing 20 is connected to the main housing 16 via non-illustrated bolts. The center of the second sub-housing 20 is in the form of a thick-walled cylindrical shaped portion. The second insertion hole 86 is formed in such a cylindrical shaped portion. The second insertion hole 86 extends along the left/right direction. The second distal end 861 of the second insertion hole 86 is separated farther away from the output shaft 204 than the second proximal end 862 of the second insertion hole 86.

The second bearing holder 88 by which the second bearing 84 is retained is inserted into the second insertion hole 86. Accordingly, the second bearing 84 is arranged in the second insertion hole 86. The second bearing 84 is sandwiched between the second inner stopper 90 positioned at the second distal end 861, and the second outer stopper 92 positioned at the second proximal end 862. Based on being sandwiched in this manner, the second bearing 84 is positioned and fixed in place.

Further, at the second distal end 861, a clearance is formed between the second inner stopper 90 and the second bearing holder 88. This clearance defines the first sub-branching passage 941.

In the second sub-housing 20, the rectifying member 96 is connected to the end surface thereof that faces toward the gas turbine engine 200. The rectifying member 96 includes the base portion 98, the reduced diameter portion 100, and the top portion 102. The base portion 98 which faces toward the second sub-housing 20 has a large diameter and a thin cylindrical plate shape. The top portion 102 which faces toward the gas turbine engine 200 has a small diameter and a relatively long cylindrical plate shape. In the reduced diameter portion 100 between the base portion 98 and the top portion 102, the diameter thereof gradually becomes smaller. Accordingly, the rectifying member 96 is a chevron shaped body or a bottomless cup shaped body. The outer surface of the reduced diameter portion 100 is a smooth surface with a small surface roughness.

In the base portion 98, the inlet ports 104 are formed in an end surface thereof that faces toward the second sub-housing 20. Further, the reduced diameter portion 100 is hollow. More specifically, the relay chamber 106 is formed in the interior of the reduced diameter portion 100. The inlet ports 104 serve as inlet ports for the compressed air to enter into the relay chamber 106.

The insertion hole 108 is formed in the top portion 102 along the left/right direction. A diameter (an opening diameter) of the insertion hole 108 is larger than the outer diameter of a portion of the second outer stopper 92 that extends along the rotating shaft 40. Therefore, a portion of the second outer stopper 92 that has entered into the insertion hole 108 and the outer circumferential wall is separated away from the inner wall of the insertion hole 108. Stated otherwise, a clearance is formed between the outer circumferential wall of the second outer stopper 92 and the inner wall of the insertion hole 108. This clearance defines the second sub-branching passage 942. The relay chamber 106 becomes wider as it comes closer in proximity to the insertion hole 108 and the second sub-branching passage 942.

Further, in the compressor wheel 222, the diameter (opening diameter) of the insertion hole 108 is larger than the outer diameter of the relatively small left end (the small diameter cylindrical portion 242). Therefore, the small diameter cylindrical portion 242 that has entered into the insertion hole 108 is also separated away from the inner wall of the insertion hole 108. Stated otherwise, a clearance is formed between the small diameter cylindrical portion 242 and the inner wall of the insertion hole 108. This clearance defines the outlet passage 943.

As shown in FIG. 12, the first insertion hole 78 and the first sub-branching passage 941 communicate with the accommodation chamber 22. Therefore, the first bearing 74 and the second bearing 84 are exposed in the accommodation chamber 22.

The stator 36 constitutes the rotating electric machine 12 together with the aforementioned rotor 34. The stator 36 includes the electromagnetic coil 110 and the plurality of insulating substrates 112. The electromagnetic coil 110 comprises three types of coils, including a U-phase coil, a V-phase coil, and a W-phase coil, and is wound around the insulating substrates 112. In the case that the rotating electric machine 12 is a generator, the rotating electric machine 12 is a so-called three-phase power source. The plurality of insulating substrates 112 are arranged in an annular shape. Due to being arranged in this manner, an inner hole is formed in the stator 36.

The stator 36 is accommodated in the accommodation chamber 22. In this instance, the second sub-housing 20 fulfills a role as a stator holder. More specifically, the annular concave portion 114 is formed in the second sub-housing 20. The insulating substrates 112 included in the stator 36 are engaged with the annular concave portion 114. Due to such engagement, the stator 36 is positioned and fixed in place. Furthermore, the columnar shaped projecting portion 76 enters into a left opening of the inner hole of the stator 36.

The inner wall of the accommodation chamber 22 and the electromagnetic coil 110 are slightly separated away from each other. Due to being separated in this manner, the main housing 16 and the electromagnetic coil 110 are electrically insulated.

A clearance is formed between the outer circumferential wall of the columnar shaped projecting portion 76 and the insulating substrates 112. A clearance is also formed between the outer walls of the permanent magnets 72 and the inner wall of the electromagnetic coil 110. As will be discussed later, the compressed air, which is a gas, flows through these clearances. Stated otherwise, these clearances make up one part of a compressed air flow passage.

As shown in FIG. 12, the first sub-housing 318 includes the annular convex portion 116 that projects out in an annular shape. The hollow concave portion 118 is formed on an inner side of the annular convex portion 116. The projecting distal end 46, which is one portion of the left end part 422 of the inner shaft 42, enters into the hollow concave portion 118.

The resolver holder 30 is provided on the annular convex portion 116. The resolver holder 30 has the flange shaped stopper 120 that is projected out toward the diametrical direction. The flange shaped stopper 120 is larger in diameter than an inner diameter of the annular convex portion 116. Accordingly, the flange shaped stopper 120 abuts against the annular convex portion 116. Due to abutting in this manner, the resolver holder 30 is positioned. In this state, the resolver holder 30 is connected to the first sub-housing 318, for example, via mounting bolts (not shown).

The small cylindrical portion 122 is provided in the resolver holder 30 on a left side of the flange shaped stopper 120. Further, the large cylindrical portion 124 is provided on a right side of the flange shaped stopper 120. The large cylindrical portion 124 is larger in diameter than the small cylindrical portion 122. The retaining hole 126 is formed in the resolver holder 30. A major portion of the resolver stator 130 is fitted into the retaining hole 126. Due to being fitted therein in this manner, the resolver stator 130 is retained by the resolver holder 30.

At a time when the large cylindrical portion 124 enters into the hollow concave portion 118 and the flange shaped stopper 120 has come into abutment against the annular convex portion 116, the resolver rotor 56 is positioned in the inner hole of the resolver stator 130. The resolver 132 is constituted by the resolver stator 130, the resolver rotor 56, and the transmission connector 136, which will be described later. The resolver 132 serves as the rotational parameter detector. According to the second embodiment, the resolver 132 detects an angle of rotation of the inner shaft 42. Moreover, as noted previously, the resolver rotor 56 is retained by the flange portion 50 on the left end part 422 of the inner shaft 42.

The engagement hole 134 is formed in the flange shaped stopper 120. The transmission connector 136 is engaged with the engagement hole 134. The resolver stator 130 and the transmission connector 136 are electrically connected via the signal line 138. A first end of the transmission connector 136 is exposed from the engagement hole 134. A connector hole (not shown) is provided on the end surface of the first end. Moreover, the reception connector of a receiver (not shown) is inserted into a connector hole. More specifically, a first end of the transmission connector 136 is a connector connecting portion. As a result of inserting the reception connector into the connector hole, the resolver 132 and the receiver are electrically connected via the transmission connector 136 and the reception connector. The receiver receives signals emitted by the resolver 132.

The plurality of tab portions 140 are provided on the small cylindrical portion 122. One of the tab portions 140 is shown in FIG. 12. Moreover, it should be noted that the tab portions 140 are omitted from being shown in FIG. 11. Furthermore, the small cylindrical portion 122 is covered by the cap cover 32. The cap cover 32 closes a left opening of the small cylindrical portion 122, and shields the left end part 422 of the inner shaft 42. Moreover, it should be noted that the cap cover 32 is connected to the tab portions 140 via connecting bolts 142.

Figure 14:
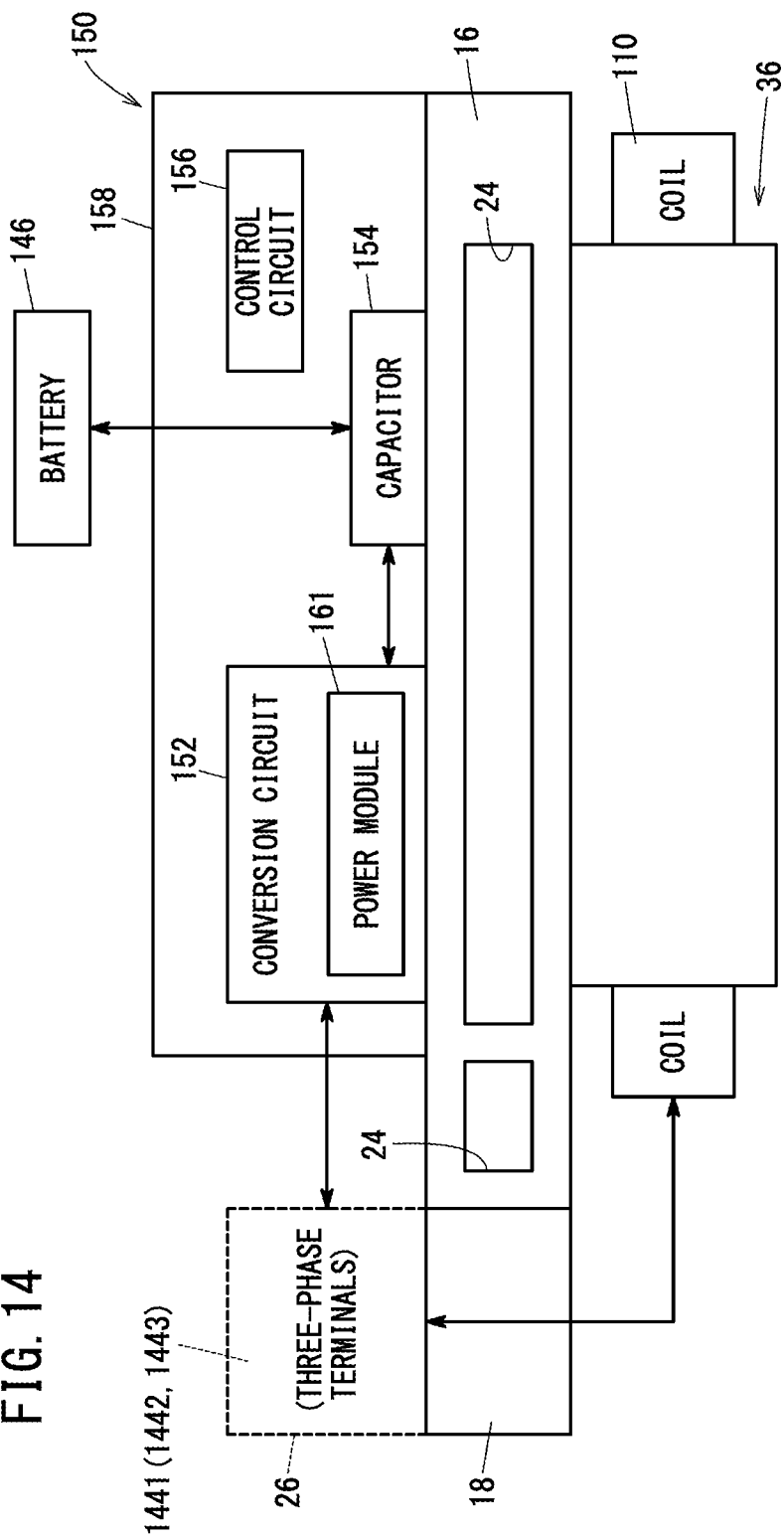
FIG. 14 is a schematic configuration diagram of a current converter provided in a rotating electric machine housing.

As noted previously, in the first sub-housing 318, the first casing 26 and the second casing 28 are integrally provided at the first end (refer to FIG. 11). The U-phase terminal 1441, the V-phase terminal 1442, and the W-phase terminal 1443 are accommodated in the first casing 26. The U-phase terminal 1441 is electrically connected to the U-phase coil within the electromagnetic coil 110. The V-phase terminal 1442 is electrically connected to the V-phase coil within the electromagnetic coil 110. The W-phase terminal 1443 is electrically connected to the W-phase coil within the electromagnetic coil 110. The U-phase terminal 1441, the V-phase terminal 1442, and the W-phase terminal 1443 are electric terminal portions to which an external device (an external load or an external power source) is electrically connected. Electrical power generated by the rotating electric machine 12 is supplied to the external device. As the external load, for example, there may be cited the motors 512. Further, as the external device, for example, there may be cited the battery 146 as shown in FIG. 14.

The second casing 28 is adjacent to the first casing 26. The thermistor 148, which serves as a temperature measurement device, is accommodated in the second casing 28. Although not illustrated in particular, measurement terminals of the thermistor 148 are connected to the electromagnetic coil 110 after having been drawn out from the second casing 28. The thermistor 148 detects (measures) the temperature of the electromagnetic coil 110. The temperature is a parameter other than the rotational parameter. The harness 149 is electrically connected to the thermistor 148. The harness 149 is connected to the transmission connector 136 that constitutes part of the resolver 132 in the interior of the first sub-housing 318.

The internal space (second flow passage) of the first casing 26 communicates with the accommodation chamber 22 via the communication passage 196. Further, the internal space of the second casing 28 and the internal space of the first casing 26 may be placed in communication with each other through a non-illustrated mutual communication hole.

As shown in FIG. 11, the current converter 150 is disposed on the outer circumferential wall of the main housing 16. The current converter 150 is located in closer proximity to the gas turbine engine 200 than the first casing 26. As shown in FIG. 14, the current converter 150 includes the conversion circuit 152, the capacitor 154, and the control circuit 156. The conversion circuit 152, the capacitor 154, and the control circuit 156 are accommodated inside the device case 158. The device case 158 is arranged, for example, on the outer circumferential wall of the main housing 16 at a location that does not interfere with the first hollow tube portion 1601, the second hollow tube portion 1602, and the third hollow tube portion 1603 (refer to FIG. 11).

The conversion circuit 152 includes the power module 161. The conversion circuit 152 converts an AC current generated by the electromagnetic coil 110 into a DC current. At this time, the capacitor 154 temporarily stores the DC current converted by the conversion circuit 152 as an electric charge. The conversion circuit 152 also possesses a function of converting the DC current delivered from the battery 146 into an AC current. In this case, the capacitor 154 temporarily stores the DC current delivered from the battery 146 toward the electromagnetic coil 110 as an electric charge.

The control circuit 156 controls a current density or the like of the DC current that flows from the capacitor 154 toward the battery 146, or the DC current that flows in the opposite direction. Moreover, the DC current from the battery 146 is supplied to the motors 512, for example, via an AC-DC converter (not shown).

In the same manner as the rotating electric machine system 10, a compressed air flow passage is provided in the rotating electric machine system 11 which is constituted in the manner described above.

In this instance, as shown in FIG. 11 and FIG. 12, at the first end where the first sub-housing 318 is provided, the portion that is projected out maximally along the first direction (the axial direction/arrow X direction of the rotating electric machine system 11) is the transmission connector 136. As shown in FIG. 12, a first virtual extrapolation line A is drawn from the left end of the transmission connector 136 toward a second direction. Moreover, the second direction is a direction perpendicular to the first direction, and according to the second embodiment, is the diametrical direction of the rotating electric machine system 11. The second direction is indicated by the arrow Y in FIGS. 11 to 13.

On the other hand, in the main housing 16, the portions which are projected out maximally along the second direction (the diametrical direction of the rotating electric machine system 11) are the first hollow tube portion 1601 through the third hollow tube portion 1603. As shown in FIG. 12, at a time when the first virtual extrapolation line A extends toward the second hollow tube portion 1602, a second virtual extrapolation line B is drawn that extends along the second hollow tube portion 1602 and toward the first virtual extrapolation line A.

In accordance with the foregoing, as shown in FIG. 12, a space SP surrounded by the first virtual extrapolation line A, the second virtual extrapolation line B, and the main housing 16 is formed. In the second embodiment, the first casing 26 is positioned inside the space SP. Further, when the side surface of the rotating electric machine system 11 is viewed, the first casing 26, and the U-phase terminal 1441, the V-phase terminal 1442, and the W-phase terminal 1443 inside the first casing 26 are arranged alongside one another in parallel.

As shown in FIGS. 11 to 13, the rotating electric machine system 11 is equipped with a fire prevention member 380. In the second embodiment, the fire prevention member 380 is a wall that is made up from a fire resistant material. The fire prevention member 380 is supported by the rotating electric machine housing 14 via a non-illustrated support column. Alternatively, the fire prevention member 380 is supported via a non-illustrated support member on the inner wall of the engine compartment 508.

By the fire prevention member 380, the engine compartment 508 is divided into a first region AR1 in which the combined power system 401 (the rotating electric machine system 11 and the gas turbine engine 200) is positioned, and a second region AR2 in which the combined power system 401 is not positioned. As noted previously, the fire prevention member 380 is made up from a fire resistant material. Accordingly, the second region AR2 is protected as a fire prevention region.

The fire prevention member 380 includes a first vertical portion 381*a*, a horizontal portion 381*b*, and a second vertical portion 381*c*. As shown in FIG. 11 and FIG. 12, a first insertion hole 382 is formed in the horizontal portion 381*b*, and a second insertion hole 384 is formed in the first vertical portion 381*a*.

The first vertical portion 381*a* is a vertical wall that extends upwardly from a downward location in close proximity to the resolver holder 30 and the first sub-housing 318. The first vertical portion 381*a* covers the first sub-housing 318 which is positioned at a first end of the rotating electric machine housing 14. As can be understood from this feature, the fire prevention member 380 shields a first end of the rotating electric machine system 11.

A first end of the transmission connector 136 is passed through the second insertion hole 384 that is formed in the first vertical portion 381*a*. Specifically, the first end of the transmission connector 136 is passed through the second insertion hole 384 and exposed in the second region AR2. In the transmission connector 136, an arbitrary site such as an intermediate portion (or a second end) thereof is positioned inside the second insertion hole 384. Accordingly, the transmission connector 136 is engaged with the second insertion hole 384. The opening dimension of the second insertion hole 384 is substantially the same as the outer dimension of the transmission connector 136. Therefore, a gap between the second insertion hole 384 and the transmission connector 136 is on the order of 1 mm or less, which is so small that it can be ignored. Stated otherwise, the second insertion hole 384 is closed by the transmission connector 136.

Signals flow via the transmission connector 136 through the signal line 138 and the harness 149. More specifically, according to the second embodiment, the signals can be exchanged between the resolver 132 and the thermistor 148 and the control device 510, while the signal line 138 and the harness 149 are protected inside the first sub-housing 318.

The horizontal portion 381b is bent substantially perpendicularly with respect to the first vertical portion 381a, and extends slightly from the first end toward a second end of the rotating electric machine housing 14. The second vertical portion 381c is bent substantially perpendicularly with respect to the horizontal portion 381b, and extends upwardly from a downward location.

The first casing 26 is passed through the first insertion hole 382 that is formed in the horizontal portion 381b. Specifically, the first end of the first casing 26 passes through the first insertion hole 382 and is exposed in the second region AR2. The first casing 26 projects out upwardly from the first insertion hole 382. In the first casing 26, an arbitrary site such as an intermediate portion (or a second end) thereof is positioned inside the first insertion hole 382. Accordingly, the first casing 26 is engaged with the first insertion hole 382. The width of the first insertion hole 382 (a dimension in a direction perpendicular to the X direction and the Y direction) is substantially the same as the outer dimension of the first casing 26. Therefore, a gap between the first insertion hole 382 and the first casing 26 is on the order of 1 mm or less, which is so small that it can be ignored. Stated otherwise, the first insertion hole 382 is closed by the first casing 26.

Figure 15:
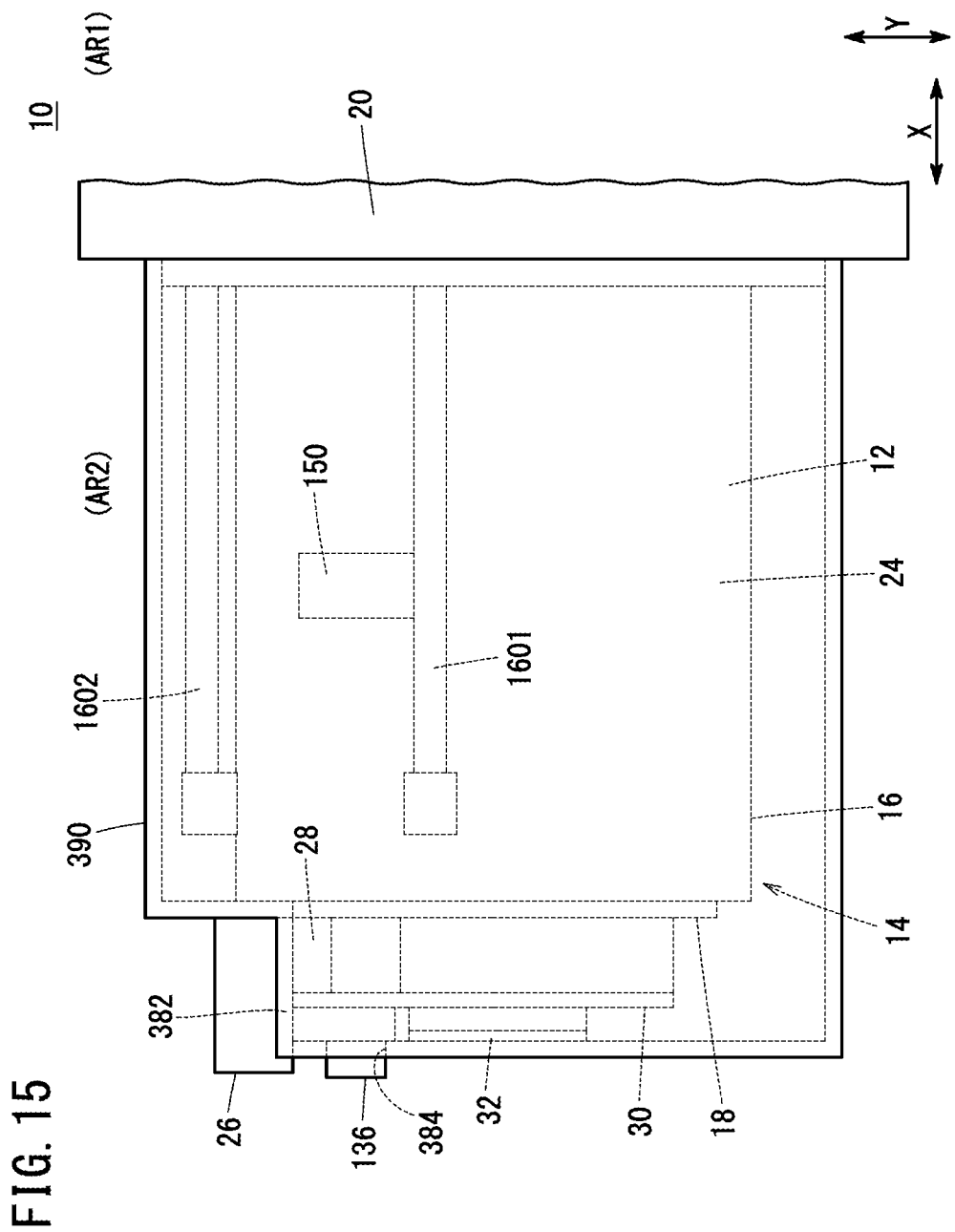
FIG. 15 is a schematic side view of a rotating electric machine system including a fire prevention member having a different shape from that shown in FIG. 11.

Instead of the fire prevention member 380, a fire prevention member 390 as shown in FIG. 15 may be provided. In this case, the fire prevention member 390 is a hollow cylindrical body in which the rotating electric machine housing can be accommodated in the interior thereof. A dimension in the lengthwise direction of the fire prevention member 390 is substantially the same as a sum of the respective dimensions in the lengthwise direction of the first sub-housing 318 and the main housing 16. Accordingly, the fire prevention member 390 covers the outer circumference of the first sub-housing 318 and the main housing 16.

A second end of the fire prevention member 390 is an open end. The diameter of the fire prevention member 390 is smaller than the diameter of the second sub-housing 20. Accordingly, in the second sub-housing 20, the second end of the fire prevention member 390 is placed in abutment against the outer surface thereof that faces toward the main housing 16.

The first insertion hole 382 and the second insertion hole 384 are formed in the fire prevention member 390. The first insertion hole 382 and the second insertion hole 384 penetrate from the inner peripheral wall toward the outer peripheral wall of the fire prevention member 390. In this case as well, the first insertion hole 382 and the second insertion hole 384 are closed respectively by the first casing 26 and the transmission connector 136.

The combined power system 401 according to the second embodiment further comprises the gas turbine engine 200. The configuration of the gas turbine engine 200 is as described in detail in the first embodiment.

The combined power system 401 according to the second embodiment is basically configured in the manner described above. Next, a description will be given concerning the advantageous effects of the combined power system 401.

As noted previously, in the rotating electric machine system 11, when the side surface of the rotating electric machine system 11 is viewed, the first casing 26, and the U-phase terminal 1441, the V-phase terminal 1442, and the W-phase terminal 1443 inside the first casing 26 are arranged alongside one another in parallel. Further, the first casing 26 is positioned inside the space SP shown in FIG. 12. The first virtual extrapolation line A that forms the space SP passes through the end of the transmission connector 136 that projects out maximally in the axial direction at the first end of the rotating electric machine system 11. The second virtual extrapolation line B that forms the space SP passes through the second hollow tube portion 1602 that is projected out maximally in the diametrical direction of the main housing 16. Accordingly, the first casing 26 is prevented from projecting out beyond the transmission connector 136 or the second hollow tube portion 1602.

More specifically, according to the second embodiment, it is possible to avoid a situation in which, along with providing the first casing 26, the diametrical dimension and the axial dimension of the rotating electric machine system 11 become larger. Consequently, the size and scale of the rotating electric machine system 11 can be reduced.

In addition, the same advantageous effects as those of the first embodiment can be obtained in the second embodiment.

The combined power systems 400 and 401 are also capable of being installed in ships, automobiles, or the like. The combined power systems 400 and 401, at a time when mounted on a ship, are used as screw rotational force generating devices. The combined power systems 400 and 401, at a time when mounted on an automobile, are used as power drive sources for rotating a motor. The combined power systems 400 and 401 are also capable of being used as power engines for auxiliary power sources in an aircraft, a ship, a building, or the like. Apart therefrom, it is also possible to utilize the combined power systems 400 and 401 as gas turbine power generation equipment.

Although in the present embodiment, the resolver 132 is employed as the rotational parameter detector, a detector that includes a Hall element can also be employed.

The rotating electric machine 12 may be a motor that rotates the rotating shaft 40 by supplying an electrical current to the electromagnetic coil 110. In this case, the U-phase terminal 1441, the V-phase terminal 1442, and the W-phase terminal 1443 serve as electric terminal portions that receive the electrical power from the battery 146.

It is also possible to disconnect the rotating electric machine systems 10 and 11 from the gas turbine engine 200, and for them to be used it independently. In a case in which it is necessary to supply the compressed air to the rotating electric machine systems 10 and 11, a compression pump may be provided externally of the rotating electric machine housing 14, and the compression pump may be used as a gas supply source.

In the gas turbine engine 200, the compressor wheel 222 and the turbine wheel 224 can also be arranged in a reverse order to that shown in FIG. 8. In this case, the through hole 240 is formed in the turbine wheel 224, and the output shaft 204 is provided in the compressor wheel 222. Apart therefrom, the compressor wheel 222 and the turbine wheel 224 may be of a centrifugal type or an axial flow type. If the compressor wheel 222 and the turbine wheel 224 are arranged on the same axis, a combination of a multi-stage compressor wheel and a multi-stage turbine wheel, which is a combination of a centrifugal type and an axial flow type, may be used.

As described above, according to the present embodiment, the rotating electric machine system (10) is provided including the rotating electric machine (12) and the rotating electric machine housing (14) in which the first end part (441) and the second end part (442) of the rotating shaft (40) of the rotating electric machine are supported, the rotating electric machine system further including the electric terminal portions (1441, 1442, and 1443) electrically connected to the rotating electric machine, the terminal casing (26) disposed at one end part of the rotating electric machine housing and in which the electric terminal portions are accommodated, and the fire prevention member (180) that covers at least the one end part of the rotating electric machine housing, and that partitions the rotating electric machine system into the first region (AR1) in which the rotating electric machine housing is positioned, and the second region (AR2) in which the rotating electric machine housing is not positioned and which serves as the fire prevention region, wherein the first insertion hole (182) is formed in the fire prevention member, and the first insertion hole is closed by the terminal casing.

The first region in which the rotating electric machine housing is positioned, and the second region in which the rotating electric machine housing is not positioned, are partitioned at the boundary with the fire prevention member. Even if sparking or excessive heat occurs in the first region, because the fire prevention member intercepts and holds back the sparking or the heat, the second region is protected from such sparking or heat and the like.

The first insertion hole is formed in the fire prevention member. The terminal casing in which the electric terminal portions are provided is exposed in the second region from the first insertion hole. Accordingly, it is not necessary to provide a relay connector in the fire prevention member. Therefore, an increase in the number of component parts is avoided.

The terminal casing is engaged with the first insertion hole. Stated otherwise, the majority of the first insertion hole is closed by the terminal casing. Consequently, a decrease in the flame shielding ability and the heat shielding ability of the fire prevention member due to the first insertion hole being formed in the fire prevention member is avoided.

According to the present embodiment, the rotating electric machine system is disclosed, further including the rotational parameter detector (132) that detects the rotational parameter of the rotating shaft, wherein the rotational parameter detector includes the transmission connector (136) that transmits the information signal concerning the rotational parameter, and the second insertion hole (184) is formed in the fire prevention member, and the second insertion hole is closed by the transmission connector.

In this case, it is not necessary to provide the relay connector in order to electrically connect the transmission connector to the fire prevention member. Therefore, an increase in the number of component parts is avoided. Further, since the majority of the second insertion hole is closed by the transmission connector, a decrease in the flame shielding ability and the heat shielding ability of the fire prevention member due to the second insertion hole being formed in the fire prevention member is avoided.

According to the present embodiment, the rotating electric machine system is disclosed, in which the first bearing (74) is disposed between the first end part of the rotating shaft and the rotating electric machine housing, and the second bearing (84) is disposed between the second end part of the rotating shaft and the rotating electric machine housing, whereby the rotating shaft is rotatably supported in the rotating electric machine housing via the first bearing and the second bearing, the first end part includes the projecting distal end (46) that passes through the first bearing and projects out to the exterior of the rotating electric machine housing, and the rotational parameter detector is provided on the projecting distal end.

According to the present configuration, the electric terminal portions and the rotational parameter detector are arranged at the one end part of the rotating electric machine housing. Accordingly, the electric terminal portions and the rotational parameter detector are in close proximity. Furthermore, maintenance of the electrical system is easy to perform.

According to the present embodiment, the rotating electric machine system is disclosed in which the material of the terminal casing is a refractory material.

In this case, even if a portion of the terminal casing is positioned in the first region, the electrical terminal portion is protected by the terminal casing from sparking or heat and the like.

The fire prevention member can be shaped in the form of a wall. More specifically, according to the present embodiment, the rotating electric machine system is disclosed in which the fire prevention member is shaped in the form of a wall.

The fire prevention member can also be a hollow body. More specifically, according to the present embodiment, the rotating electric machine system is disclosed in which the fire prevention member (190) is a hollow body in which the rotating electric machine housing is accommodated.

In the present embodiment, the combined power system (400) is disclosed, which is equipped with the rotating electric machine system (10) constituted in the manner described above, and the internal combustion engine (200). In this instance, the internal combustion engine includes the output shaft (204) that rotates integrally with the rotating shaft of the rotating electric machine. The output shaft is connected to the second end part of the rotating shaft, and the internal combustion engine is positioned in the first region.

Along with the rotating electric machine system being made smaller in scale, the combined power system is also made smaller in scale. Also, the combined power system which is made smaller in scale is lightweight.

According to the present embodiment, the rotating electric machine system is disclosed in which, in the rotating electric machine system (11) having the rotating electric machine (12), and the rotating electric machine housing (14) in which the rotating shaft (40) of the rotating electric machine is rotatably supported, the rotating shaft includes the first end part (441) and the second end part (442), and the first bearing (74) is disposed between the rotating electric machine housing and the first end part, and the second bearing (84) is disposed between the rotating electric machine housing and the second end part, whereby the rotating shaft is rotatably supported in the rotating electric machine housing via the first bearing and the second bearing, the first end part includes the projecting distal end (46) that passes through the first bearing and projects out to the exterior of the rotating electric machine housing, the rotating electric machine system includes the rotational parameter detector (132) disposed at the projecting distal end via the retaining member (30), and that detects the rotational parameter of the rotating shaft, and the electric terminal portions (1441, 1442, and 1443) electrically connected to the rotating electric machine; and further including the terminal casing (26) provided on the one end part of the rotating electric machine and in which the electric terminal portions are accommodated, and the fire prevention member (380) that covers at least the one end part of the rotating electric machine housing, and partitions the rotating electric machine system into the first region (AR1) in which the rotating electric machine housing is positioned, and the second region (AR2) in which the rotating electric machine housing is not positioned and which serves as the fire prevention region, wherein, in the rotating electric machine system, at a time when viewed from a side surface along the first direction which is the axial direction of the rotating electric machine system, the terminal casing and the rotational parameter detector are arranged in parallel alongside one another, and the first insertion hole (382) is formed in the fire prevention member, and the first insertion hole is closed by the terminal casing.

The first region in which the rotating electric machine housing is positioned, and the second region in which the rotating electric machine housing is not positioned, are partitioned at the boundary with the fire prevention member. Even if sparking or excessive heat occurs in the first region, because the fire prevention member intercepts and holds back the sparking or the heat, the second region is protected from such sparking or heat and the like.

The first insertion hole is formed in the fire prevention member. The terminal casing in which the electric terminal portions are provided is exposed in the second region from the first insertion hole. Accordingly, it is not necessary to provide a relay connector in the fire prevention member. Therefore, an increase in the number of component parts is avoided.

The terminal casing is engaged with the first insertion hole. Stated otherwise, the majority of the first insertion hole is closed by the terminal casing. Consequently, a decrease in the flame shielding ability and the heat shielding ability of the fire prevention member due to the first insertion hole being formed in the fire prevention member is avoided.

Further, in the configuration described above, the terminal casing is prevented from projecting out beyond the rotational parameter detector along the axial direction (the first direction) of the rotating electric machine system. Accordingly, an increase in the axial dimension of the rotating electric machine system is avoided. As a result, it is possible to reduce the size and scale of the rotating electric machine system in the axial direction. Further, since the electric terminal portions are arranged at the one end part of the rotating electric machine housing, the electric terminal portions and the rotational parameter detector are in close proximity to each other. Therefore, it is possible to reduce the size and scale of the rotating electric machine system in a direction (a second direction) perpendicular to the axial direction. Furthermore, maintenance of the electrical system is easy to perform.

The present embodiment discloses the rotating electric machine system, in which the rotational parameter detector includes the transmission connector (136) that transmits the information signal concerning the rotational parameter, and the second insertion hole (384) is formed in the fire prevention member, and the second insertion hole is closed by the transmission connector.

In this case, it is not necessary to provide the relay connector in order to electrically connect the transmission connector to the fire prevention member. Therefore, an increase in the number of component parts is avoided. Further, since the majority of the second insertion hole is closed by the transmission connector, a decrease in the flame shielding ability and the heat shielding ability of the fire prevention member due to the second insertion hole being formed in the fire prevention member is avoided.

In the present embodiment, the rotating electric machine system is disclosed, in which the rotating electric machine housing includes the hollow main housing (16) in which both ends thereof are open ends, the first sub-housing (18) that closes the one of the open ends of the main housing, and the second sub-casing (20) that closes the other of the open ends of the main housing, and when the first virtual extrapolation line (A) is drawn extending in the second direction perpendicular to the first direction from the portion (136) that is projected out maximally along the first direction in the end part of the rotating electric machine system at which the first sub-housing is provided, and the second virtual extrapolation line (B) is drawn extending toward the first virtual extrapolation line from the portion (1602) that is projected out maximally along the second direction in the main housing, the terminal casing is arranged in the space (SP) surrounded by the first virtual extrapolation line, the second virtual extrapolation line, and the main housing.

In this case, when the side of the rotating electric machine system is viewed, in the main housing, the terminal casing and the electric terminal portions are prevented from projecting out more so than an end part in the second direction. Accordingly, in the rotating electric machine system, a situation is avoided in which the dimension along the second direction becomes large. Therefore, it is possible to reduce the size and scale of the rotating electric machine system.

According to the present embodiment, the rotating electric machine system is disclosed in which the material of the terminal casing (26) is a refractory material.

In this case, even if a portion of the terminal casing is positioned in the first region, the electrical terminal portion is protected by the terminal casing from sparking or heat and the like.

The fire prevention member can be shaped in the form of a wall. More specifically, according to the present embodiment, the rotating electric machine system is disclosed in which the fire prevention member is shaped in the form of a wall.

The fire prevention member can also be a hollow body. More specifically, according to the present embodiment, the rotating electric machine system is disclosed in which the fire prevention member (190) is a hollow body in which the rotating electric machine housing is accommodated.

In the present embodiment, the combined power system (401) is disclosed, which is equipped with the rotating electric machine system (11) constituted in the manner described above, and the internal combustion engine (200). In this instance, the internal combustion engine includes the output shaft (204) that rotates integrally with the rotating shaft of the rotating electric machine. The output shaft is connected to the second end part of the rotating shaft, and the internal combustion engine is positioned in the first region.

Along with the rotating electric machine system being made smaller in scale, the combined power system is also made smaller in scale. Also, the combined power system which is made smaller in scale is lightweight.

Moreover, it should be noted that the present invention is not limited to the disclosure described above, but various configurations may be adopted therein without departing from the essence and gist of the present invention.

The invention claimed is:

1. A rotating electric machine system comprising a rotating electric machine and a rotating electric machine housing in which a first end part and a second end part of a rotating shaft of the rotating electric machine are supported, the rotating electric machine system further comprising:
    electric terminal portions electrically connected to the rotating electric machine;
    a terminal casing disposed at one end part of the rotating electric machine housing and in which the electric terminal portions are accommodated; and
    a fire prevention member configured to cover at least the one end part of the rotating electric machine housing, and to partition the rotating electric machine system into a first region in which the rotating electric machine housing is positioned, and a second region in which the rotating electric machine housing is not positioned and which serves as a fire prevention region;
    wherein a first insertion hole is formed in the fire prevention member, and the first insertion hole is closed by the terminal casing.

2. The rotating electric machine system according to claim 1, further comprising:
    a rotational parameter detector configured to detect a rotational parameter of the rotating shaft;
    wherein the rotational parameter detector comprises a transmission connector configured to transmit an information signal concerning the rotational parameter; and
    a second insertion hole is formed in the fire prevention member, and the second insertion hole is closed by the transmission connector.

3. The rotating electric machine system according to claim 2, wherein:
    a first bearing is disposed between the first end part of the rotating shaft and the rotating electric machine housing, and a second bearing is disposed between the second end part of the rotating shaft and the rotating electric machine housing, whereby the rotating shaft is rotatably supported in the rotating electric machine housing via the first bearing and the second bearing;
    the first end part includes a projecting distal end configured to pass through the first bearing and project out to exterior of the rotating electric machine housing; and
    the rotational parameter detector is provided on the projecting distal end.

4. The rotating electric machine system according to claim 1, wherein:
    a first bearing is disposed between the rotating electric machine housing and the first end part, and a second bearing is disposed between the rotating electric machine housing and the second end part, whereby the rotating shaft is rotatably supported in the rotating electric machine housing via the first bearing and the second bearing;
    the first end part includes a projecting distal end configured to pass through the first bearing and project out to exterior of the rotating electric machine housing;
    a rotational parameter detector is provided on the projecting distal end via a retaining member, and is configured to detect a rotational parameter of the rotating shaft;
    in the rotating electric machine system, at a time when viewed from a side surface along a first direction which is an axial direction of the rotating electric machine system, the terminal casing and the rotational parameter detector are arranged in parallel alongside one another; and
    the first insertion hole is formed in the fire prevention member, and the first insertion hole is closed by the terminal casing.

5. The rotating electric machine system according to claim 4, wherein:
    the rotational parameter detector comprises a transmission connector configured to transmit an information signal concerning the rotational parameter; and
    a second insertion hole is formed in the fire prevention member, and the second insertion hole is closed by the transmission connector.

6. The rotating electric machine system according to claim 4, wherein:
    the rotating electric machine housing comprises a hollow main housing in which both ends thereof are open ends, a first sub-housing configured to close one of the open ends of the main housing, and a second sub-housing configured to close another one of the open ends of the main housing; and
    when a first virtual extrapolation line is drawn extending in a second direction perpendicular to the first direction from a portion that is projected out maximally along the first direction in an end part of the rotating electric machine system at which the first sub-housing is provided, and a second virtual extrapolation line is drawn extending toward the first virtual extrapolation line from a portion that is projected out maximally along the second direction in the main housing, the terminal casing is arranged in a space surrounded by the first virtual extrapolation line, the second virtual extrapolation line, and the main housing.

7. The rotating electric machine according to claim 1, wherein a material of the terminal casing is a refractory material.

8. The rotating electric machine according to claim 1, wherein the fire prevention member is shaped in a form of a wall.

9. The rotating electric machine according to claim 1, wherein the fire prevention member is a hollow body in which the rotating electric machine housing is accommodated.

10. A combined power system, comprising:
    a rotating electric machine system comprising a rotating shaft and a rotating electric machine housing, and an internal combustion engine including an output shaft;
    wherein the rotating shaft includes a first end part and a second end part, and the rotating electric machine housing is configured to rotatably support the first end part and the second end part of the rotating shaft; and
    the output shaft is connected to the second end part of the rotating shaft, the combined power system further comprising:
    a terminal casing disposed at one end part of the rotating electric machine housing and in which the electric terminal portions are accommodated; and
    a fire prevention member configured to cover at least the one end part of the rotating electric machine housing, and to partition the rotating electric machine system into a first region in which the rotating electric machine housing is positioned, and a second region in which the rotating electric machine housing is not positioned and which serves as a fire prevention region;

wherein a first insertion hole is formed in the fire prevention member, and the terminal casing closes the first insertion hole; and the internal combustion engine is positioned in the first region.

11. The combined power system according to claim 10, further comprising:

a rotational parameter detector configured to detect a rotational parameter of the rotating shaft;

wherein the rotational parameter detector comprises a transmission connector configured to transmit an information signal concerning the rotational parameter; and a second insertion hole is formed in the fire prevention member, and the second insertion hole is closed by the transmission connector.

12. The combined power system according to claim 11, wherein:

a first bearing is disposed between the first end part of the rotating shaft and the rotating electric machine housing, and a second bearing is disposed between the second end part of the rotating shaft and the rotating electric machine housing, whereby the rotating shaft is rotatably supported in the rotating electric machine housing via the first bearing and the second bearing;

the first end part includes a projecting distal end configured to pass through the first bearing and project out to exterior of the rotating electric machine housing; and the rotational parameter detector is provided on the projecting distal end.

13. The combined power system according to claim 10, wherein:

a first bearing is disposed between the rotating electric machine housing and the first end part, and a second bearing is disposed between the rotating electric machine housing and the second end part, whereby the rotating shaft is rotatably supported in the rotating electric machine housing via the first bearing and the second bearing;

the first end part includes a projecting distal end configured to pass through the first bearing and project out to exterior of the rotating electric machine housing;

the rotating electric machine system comprises a rotational parameter detector provided on the projecting distal end via a retaining member, and which is configured to detect a rotational parameter of the rotating shaft;

in the rotating electric machine system, at a time when viewed from a side surface along a first direction which is an axial direction of the rotating electric machine system, the terminal casing and the rotational parameter detector are arranged in parallel alongside one another; and the first insertion hole is formed in the fire prevention member, and the first insertion hole is closed by the terminal casing.

14. The combined power system according to claim 13, wherein:

the rotational parameter detector comprises a transmission connector configured to transmit an information signal concerning the rotational parameter; and a second insertion hole is formed in the fire prevention member, and the second insertion hole is closed by the transmission connector.

15. The combined power system according to claim 13, wherein:

the rotating electric machine housing comprises a hollow main housing in which both ends thereof are open ends, a first sub-housing configured to close one of the open ends of the main housing, and a second sub-housing configured to close another one of the open ends of the main housing; and when a first virtual extrapolation line is drawn extending in a second direction perpendicular to the first direction from a portion that is projected out maximally along the first direction in an end part of the rotating electric machine system at which the first sub-housing is provided, and a second virtual extrapolation line is drawn extending toward the first virtual extrapolation line from a portion that is projected out maximally along the second direction in the main housing, the terminal casing is arranged in a space surrounded by the first virtual extrapolation line, the second virtual extrapolation line, and the main housing.

16. The combined power system according to claim 10, wherein a material of the terminal casing is a refractory material.

17. The combined power system according to claim 10, wherein the fire prevention member is shaped in a form of a wall.

18. The combined power system according to claim 10, wherein the fire prevention member is a hollow body in which the rotating electric machine housing is accommodated.

* * * * *